US012782846B2

(12) United States Patent
Tanaka et al.

(10) Patent No.: US 12,782,846 B2
(45) Date of Patent: Nov. 3, 2026

(54) DEVELOPING DEVICE WITH PLURAL ROTATION MEMBERS AND MAGNETS

(71) Applicant: CANON KABUSHIKI KAISHA, Tokyo (JP)

(72) Inventors: Chihiro Tanaka, Chiba (JP); Yuji Ohkubo, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/919,845

(22) Filed: Oct. 18, 2024

(65) Prior Publication Data

US 2025/0138450 A1 May 1, 2025

(30) Foreign Application Priority Data

Oct. 30, 2023 (JP) ................................ 2023-185955

(51) Int. Cl.
*G03G 15/08* (2006.01)
*G03G 15/09* (2006.01)
*G03G 15/095* (2006.01)

(52) U.S. Cl.
CPC ..... *G03G 15/0891* (2013.01); *G03G 15/0808* (2013.01); *G03G 15/0921* (2013.01);
(Continued)

(58) Field of Classification Search
CPC ............ G03G 15/0891; G03G 15/095; G03G 2215/083; G03G 2215/085;
(Continued)

(56) References Cited

U.S. PATENT DOCUMENTS 5,545,840 A * 8/1996 Doi ........................ G03G 15/09
399/274
11,846,898 B2 12/2023 Tanaka
(Continued)

FOREIGN PATENT DOCUMENTS

JP H11-327308 A 11/1999
JP 2007-139920 A 6/2007
(Continued)

OTHER PUBLICATIONS

Yuji Ohkubo et al., U.S. Appl. No. 18/919,726, filed Oct. 18, 2024.

*Primary Examiner* — Stephanie E Bloss
*Assistant Examiner* — Laura Roth
(74) *Attorney, Agent, or Firm* — VENABLE LLP

(57) ABSTRACT

The developing device includes a first rotatable member, a first magnet, a second rotatable member, and a second magnet. When a position where, on the second rotatable member surface, a magnetic flux density of the receiving pole is maximum, is a point T, of a position where the magnetic flux density of the receiving pole is a half value of the maximum on an upstream side is a point Hu, the position on a downstream side is a point Hd, an angle formed by a rectilinear line L20 connecting a rotation center R2 of the second rotatable member and the point T and a rectilinear line L21 connecting the rotation center R2 and the point Hu is wθ21, and an angle formed by L20 and a rectilinear line L22 connecting R2 and Hd is wθ22, the following relationship is satisfied: wθ22-wθ21 ≥0.

10 Claims, 22 Drawing Sheets

(52) U.S. Cl.
CPC ... *G03G 15/095* (2013.01); *G03G 2215/0648* (2013.01); *G03G 2215/083* (2013.01); *G03G 2215/085* (2013.01)

(58) Field of Classification Search
CPC .......... G03G 15/0921; G03G 15/0928; G03G 15/0808; G03G 15/0812; G03G 2215/0609; G03G 2215/0648
See application file for complete search history.

(56) References Cited

U.S. PATENT DOCUMENTS

| | | | | |
|---|---|---|---|---|
| 12,197,147 | B2 | 1/2025 | Tanaka | |
| 2004/0022560 | A1 | 2/2004 | Hirobe | |
| 2004/0076454 | A1* | 4/2004 | Nishiyama | G03G 15/09 399/269 |
| 2005/0238390 | A1 | 10/2005 | Fukuda | |
| 2010/0196045 | A1 | 8/2010 | Kabashima | |
| 2013/0101320 | A1 | 4/2013 | Okamoto et al. | |
| 2013/0243493 | A1* | 9/2013 | Yoshioka | G03G 15/0812 399/269 |
| 2013/0330107 | A1 | 12/2013 | Itagaki et al. | |
| 2014/0016969 | A1 | 1/2014 | Yoshii | |
| 2014/0023408 | A1 | 1/2014 | Kato | |
| 2014/0140739 | A1 | 5/2014 | Sato | |
| 2018/0143581 | A1 | 5/2018 | Nakayama | |
| 2018/0341198 | A1 | 11/2018 | Sakamaki et al. | |
| 2019/0250531 | A1 | 8/2019 | Shigehiro | |
| 2024/0272564 | A1 | 8/2024 | Tanaka | |
| 2024/0272565 | A1* | 8/2024 | Ariizumi | G03G 15/0893 |
| 2025/0138450 | A1 | 5/2025 | Tanaka et al. | |
| 2025/0138451 | A1* | 5/2025 | Ohkubo | G03G 15/0928 |

FOREIGN PATENT DOCUMENTS

| | | | |
|---|---|---|---|
| JP | 2011-095516 | A | 5/2011 |
| JP | 2013-254107 | A | 12/2013 |
| JP | 2014-238514 | A | 12/2014 |
| JP | 2018-142031 | A | 9/2018 |

* cited by examiner

DEVELOPING DEVICE WITH PLURAL ROTATION MEMBERS AND MAGNETS

FIELD OF THE INVENTION AND RELATED ART

The present invention relates to a developing device for developing an electrostatic latent image, formed on an image bearing member, with a developer.

As the developing device, a constitution in which two developing rollers for developing the electrostatic latent image, formed on the image bearing member, with the developer are arranged side by side with respect to a rotational direction of the image bearing member is proposed (United States Patent Application Publication No. 2013/0330107). In the developing device disclosed in US2013/0330107 A1, of the two developing rollers, to a first developing roller positioned at a lower portion in the vertical direction, the developer is supplied from a supplying portion, and to a second developing roller positioned at an upper portion in the vertical direction, the developer is delivered from the first developing roller positioned at the lower portion.

As described in US2013/0330107 A1, in the case where the developer is delivered from the first developing roller to the second developing roller positioned at the upper portion in the vertical direction, delivery of the developer is made by a magnetic field formed between a delivering pole of a first magnet provided in the first developing roller and a receiving pole of a second magnet provided in the second developing roller. The delivering pole is opposite in polarity to the receiving pole. In such a constitution, when a rotational direction of the second developing roller is opposite to a rotational direction of the first developing roller in a position where the second developing roller opposes the first developing roller, a first magnetic pole adjacent to the delivering pole on a side upstream of the delivering pole is opposite in polarity to a second magnetic pole adjacent to the receiving pole on a side downstream of the receiving pole. For this reason, between the first magnetic pole and the second magnetic pole, a magnetic field for attracting the developer to each of the rollers is generated.

Thus, the magnetic field for attracting the developer is generated between the first magnetic pole and the second magnetic pole, there is a liability that movement of the developer is generated between the first magnetic pole and the second magnetic pole by this magnetic field. Further, when the developer movement is generated between the first magnetic pole and the second magnetic pole, there is a liability that the moving developer floats and then is deposited on an image bearing member positioned in the neighborhood of the first developing roller and the second developing roller. Thus, when the developer is deposited on the image bearing member, an image defect such as a fog in a vertical stripe shape occurs on an output image.

SUMMARY OF THE INVENTION

A principal object of the present invention is to provide a developing device capable of suppressing an occurrence of an image defect.

According to an aspect of the present invention, there is provided a developing device comprising: a developing container configured to accommodate a developer including toner and a carrier; a first rotatable member to which the developer accommodated in the developing container is supplied and which carries and feeds the developer to a first developing position where an electrostatic latent image formed on an image bearing member is developed; a first magnet provided non-rotatably and stationarily inside the first rotatable member, wherein the first magnet includes a first developing pole provided opposed to the image bearing member in the first developing position, a delivering pole provided downstream of the first developing pole with respect to a rotational direction of the first rotatable member, and a first feeding pole provided upstream of the delivering pole and adjacent to the delivering pole, with respect to the rotational direction of the first rotatable member, and having a magnetic polarity different from the delivering pole; a second rotatable member provided opposed to the first rotatable member and to which the developer is delivered from the first rotatable member by a magnetic field generated by the first magnet, wherein the second rotatable member carries and feeds the developer to a second developing position where the electrostatic latent image is developed, and wherein a rotational direction of the second rotatable member in a position where on an outer peripheral surface of the second rotatable member, the second rotatable member is closest to the first rotatable member is opposite to the rotational direction of the first rotatable member in a position where on an outer peripheral surface of the first rotatable member, the first rotatable member is closest to the second rotatable member; and a second magnet provided non-rotatably and stationarily inside the second rotatable member, wherein the second magnet includes a plurality of magnetic poles including a second developing pole provided opposed to the image bearing member in the second developing position, a receiving pole provided upstream of the second developing pole with respect to the rotational direction of the second rotatable member and having a magnetic polarity different from that of the delivering pole, and a second feeding pole provided downstream of the receiving pole and adjacent to the receiving pole, with respect to the rotational direction of the second rotatable member, and having a magnetic polarity different from that of the receiving pole, the receiving pole being a magnetic pole, of the plurality of magnetic poles, provided closest to the delivering pole, wherein in a case where a position where on the outer peripheral surface of the second rotatable member, a magnetic flux density of the receiving pole in a normal direction relative to the outer peripheral surface of the second rotatable member is maximum is a point T, of positions each where on the outer peripheral surface of the second rotatable member, the magnetic flux density of the receiving pole in the normal direction relative to the outer peripheral surface of the second rotatable member is a half value of the maximum, the position on an upstream side with respect to the rotational direction of the second rotatable member is a point Hu, of the positions each where on the outer peripheral surface of the second rotatable member, the magnetic flux density of the receiving pole in the normal direction relative to the outer peripheral surface of the second rotatable member is the half value of the maximum, the position on a downstream side with respect to the rotational direction of the second rotatable member is a point Hd, an angle formed by a rectilinear line L20 connecting a rotation center R2 of the second rotatable member and the point T and by a rectilinear line L21 connecting the rotation center R2 and the point Hu is $w\theta 21$, and an angle formed by the rectilinear line L20 and a rectilinear line L22 connecting the rotation center R2 and the point Hd is $w\theta 22$, the following relationship is satisfied: $w\theta 22 - w\theta 21 \geq 0$.

According to another aspect of the present invention, there is provided a developing device comprising: a developing container configured to accommodate a developer including toner and a carrier; a first rotatable member to which the developer accommodated in the developing container is supplied and which carries and feeds the developer to a first developing position where an electrostatic latent image formed on an image bearing member is developed; a first magnet provided non-rotatably and stationarily inside the first rotatable member, wherein the first magnet includes a first developing pole provided opposed to the image bearing member in the first developing position, a delivering pole provided downstream of the first developing pole with respect to a rotational direction of the first rotatable member, and a first feeding pole provided upstream of the delivering pole and adjacent to the delivering pole, with respect to the rotational direction of the first rotatable member, and having a magnetic polarity different from the delivering pole; a second rotatable member provided opposed to the first rotatable member and to which the developer is delivered from the first rotatable member by a magnetic field generated by the first magnet, wherein the second rotatable member carries and feeds the developer to a second developing position where the electrostatic latent image is developed, and wherein a rotational direction of the second rotatable member in a position where on an outer peripheral surface of the second rotatable member, the second rotatable member is closest to the first rotatable member is opposite to the rotational direction of the first rotatable member in a position where on an outer peripheral surface of the first rotatable member, the first rotatable member is closest to the second rotatable member; and a second magnet provided non-rotatably and stationarily inside the second rotatable member, wherein the second magnet includes a plurality of magnetic poles including a second developing pole provided opposed to the image bearing member in the second developing position, a receiving pole provided upstream of the second developing pole with respect to the rotational direction of the second rotatable member and having a magnetic polarity different from that of the delivering pole, and a second feeding pole provided downstream of the receiving pole and adjacent to the receiving pole, with respect to the rotational direction of the second rotatable member, and having a magnetic polarity different from that of the receiving pole, the receiving pole being a magnetic pole, of the plurality of magnetic poles, provided closest to the delivering pole, wherein a position where on the outer peripheral surface of the second rotatable member, a magnetic flux density of the receiving pole in a normal direction relative to the outer peripheral surface of the second rotatable member is maximum is a point T, of positions each where on the outer peripheral surface of the second rotatable member, the magnetic flux density of the receiving pole in the normal direction relative to the outer peripheral surface of the second rotatable member is a half value of the maximum, the position on an upstream side with respect to the rotational direction of the second rotatable member is a point Hu, and of the positions each where on the outer peripheral surface of the second rotatable member, the magnetic flux density of the receiving pole in the normal direction relative to the outer peripheral surface of the second rotatable member is the half value of the maximum, the position on a downstream side with respect to the rotational direction of the second rotatable member is a point Hd, and wherein in a graph in which an ordinate represents the magnetic flux density of the receiving pole in the normal direction relative to the outer peripheral surface of the second rotatable member and an abscissa represents an angle of the second rotatable member with respect to the rotational direction of the first rotatable member, in a case where a rectilinear line passing through the point T and parallel to the abscissa is a rectilinear line HLt, a rectilinear line passing through the points Hu and Hd and parallel to the abscissa is HLh, a rectilinear line passing through the point Hu and parallel to the ordinate is VL21, a rectilinear line passing through the point Hd and parallel to the ordinate is VL22, an area of a rectangle enclosed by the rectilinear lines VL21, VL22, HLt, and HLh is an area S, and in a region of the rectangle, an area obtained by integrating the magnetic flux density of the receiving pole, in the normal direction relative to the outer peripheral surface of the second rotatable member, from the rectilinear line VL21 to the rectilinear line VL22 in terms of the angle of the second rotatable member with respect to the rotational direction of the second rotatable member is an area Sa, the following relationship is satisfied: $Sa/S \geq 75\%$.

According to a further aspect of the present invention, there is provided a developing device comprising: a developing container configured to accommodate a developer including toner and a carrier; a first rotatable member to which the developer accommodated in the developing container is supplied and which carries and feeds the developer to a first developing position where an electrostatic latent image formed on an image bearing member is developed; a first magnet provided non-rotatably and stationarily inside the first rotatable member, wherein the first magnet includes a first developing pole provided opposed to the image bearing member in the first developing position, a delivering pole provided downstream of the first developing pole with respect to a rotational direction of the first rotatable member, and a first feeding pole provided upstream of the delivering pole and adjacent to the delivering pole, with respect to the rotational direction of the first rotatable member, and having a magnetic polarity different from the delivering pole; a second rotatable member provided opposed to the first rotatable member and to which the developer is delivered from the first rotatable member by a magnetic field generated by the first magnet, wherein the second rotatable member carries and feeds the developer to a second developing position where the electrostatic latent image is developed, and wherein a rotational direction of the second rotatable member in a position where on an outer peripheral surface of the second rotatable member, the second rotatable member is closest to the first rotatable member is opposite to the rotational direction of the first rotatable member in a position where on an outer peripheral surface of the first rotatable member, the first rotatable member is closest to the second rotatable member; and a second magnet provided non-rotatably and stationarily inside the second rotatable member, wherein the second magnet includes a plurality of magnetic poles including a second developing pole provided opposed to the image bearing member in the second developing position, a receiving pole provided upstream of the second developing pole with respect to the rotational direction of the second rotatable member and having a magnetic polarity different from that of the delivering pole, and a second feeding pole provided downstream of the receiving pole and adjacent to the receiving pole, with respect to the rotational direction of the second rotatable member, and having a magnetic polarity different from that of the receiving pole, the receiving pole being a magnetic pole, of the plurality of magnetic poles, provided closest to the delivering pole, wherein a position where on the outer peripheral surface of the second rotatable member, a magnetic flux density of the receiving pole in a normal direction relative to the outer peripheral surface of the second rotatable member is maximum is a point T, of positions each where on the outer peripheral surface of the second rotatable member, the magnetic flux density of the receiving pole in the normal direction relative to the outer peripheral surface of the second rotatable member is a half value of the maximum, the position on an upstream side with respect to the rotational direction of the second rotatable member is a point Hu, and of the positions each where on the outer peripheral surface of the second rotatable member, the magnetic flux density of the receiving pole in the normal direction relative to the outer peripheral surface of the second rotatable member is the half value of the maximum, the position on a downstream side with respect to the rotational direction of the second rotatable member is a point Hd, and wherein in a graph in which an ordinate represents the magnetic flux density of the receiving pole in the normal direction relative to the outer peripheral surface of the second rotatable member and an abscissa represents an angle of the second rotatable member with respect to the rotational direction of the second rotatable member, in a case where of positions each where the magnetic flux density of the receiving pole in the normal direction relative to the outer peripheral surface of the second rotatable member is a value which is 10% of the maximum of the magnetic flux density of the receiving pole in the normal direction relative to the outer peripheral surface of the second rotatable member, the position on an upstream side with respect to the rotational direction of the second rotatable member is a point Cu, of positions each where the magnetic flux density of the receiving pole in the normal direction relative to the outer peripheral surface of the second rotatable member is a value which is 10% of the maximum of the magnetic flux density of the receiving pole in the normal direction relative to the outer peripheral surface of the second rotatable member, the position on a downstream side with respect to the rotational direction of the second rotatable member is a point Cd, of positions each where the magnetic flux density of the receiving pole in the normal direction relative to the outer peripheral surface of the second rotatable member is a value which is 90% of the maximum of the magnetic flux density of the receiving pole in the normal direction relative to the outer peripheral surface of the second rotatable member, the position on an upstream side with respect to the rotational direction of the second rotatable member is a point Du, of positions each where the magnetic flux density of the receiving pole in the normal direction relative to the outer peripheral surface of the second rotatable member is a value which is 90% of the maximum of the magnetic flux density of the receiving pole in the normal direction relative to the outer peripheral surface of the second rotatable member, the position on a downstream side with respect to the rotational direction of the second rotatable member is a point Dd, an angle formed by a rectilinear line L21C connecting the rotation center R2 and the point Cu and a rectilinear line L22C connecting the rotation center R2 and the point Cd is Wc, and an angle formed by a rectilinear line L21D connecting the rotation center R2 and the point Du and a rectilinear line L22D connecting the rotation center R2 and the point Dd is Wd, and the following relationship is satisfied: $Wd/Wc \geq 40\%$.

Further features of the present invention will become apparent from the following description of exemplary embodiments with reference to the attached drawings.

DESCRIPTION OF THE EMBODIMENTS

First Embodiment

A first embodiment will be described using FIGS. 1 to 12. First, a general structure of an image forming apparatus in this embodiment will be described with reference to FIG. 1.

[Image Forming Apparatus]

Figure 1:
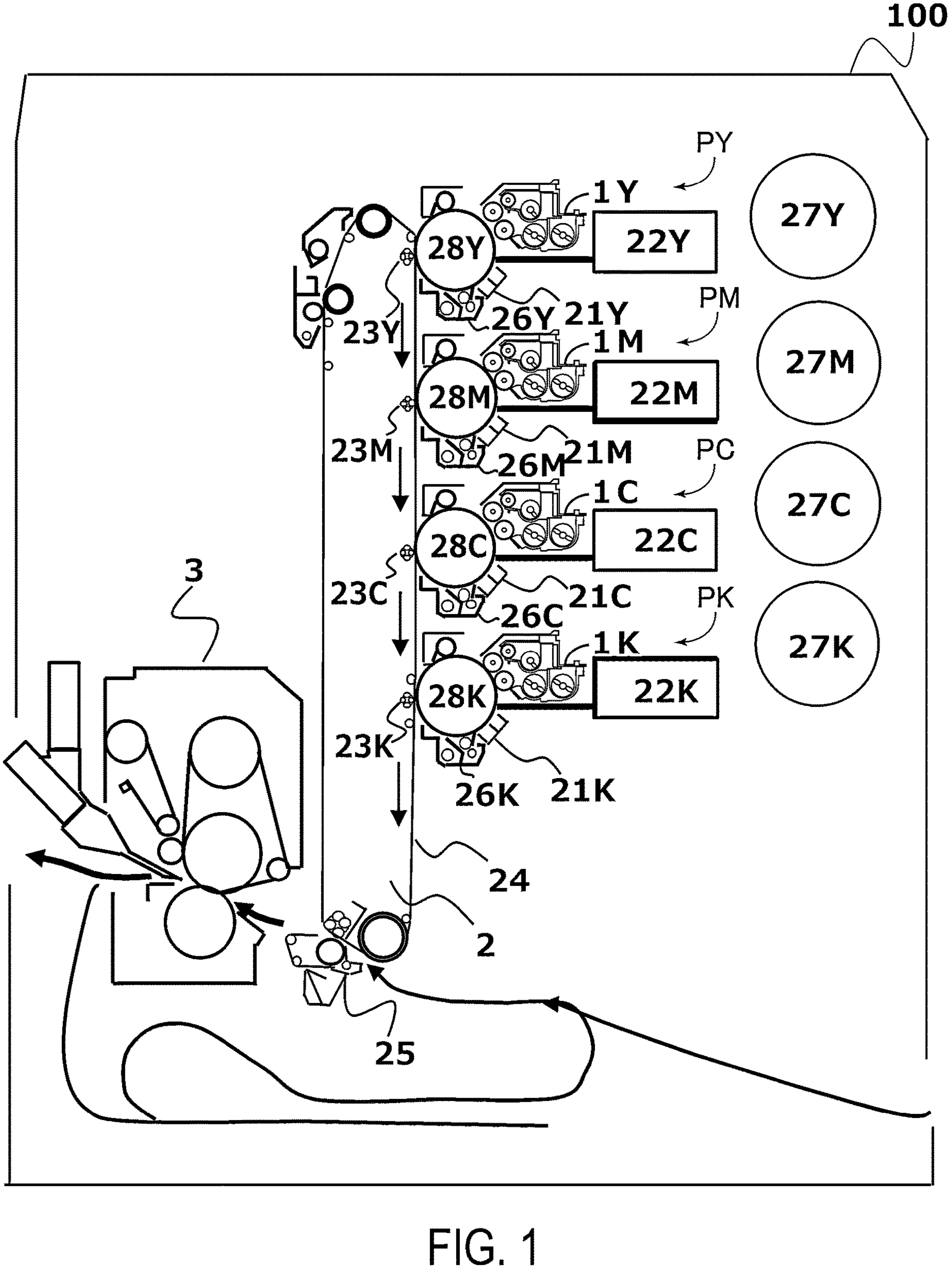
FIG. 1 is a schematic sectional view of an image forming apparatus in a first embodiment.

An image forming apparatus 100 is a full-color image forming apparatus, and in the case of this embodiment, the image forming apparatus 100 is, for example, an MFP (multi-function peripheral) having a copy function, a printer function, and a scan function. The image forming apparatus 100 includes, as shown in FIG. 1, image forming portions PY, PM, PC, and PK for performing an image forming step of forming toner images of four colors of yellow, magenta, cyan, and black, respectively, which are juxtaposed.

The image forming portions PY, PM, PC, and PK for the respective colors include primary chargers 21Y, 21M, 21C, and 21K, developing devices 1Y, 1M, 1C, and 1K, optical write portions (exposure devices) 22Y, 22M, 22C, and 22K, photosensitive drums 28Y, 28M, 28C, and 28K, and a cleaning devices 26Y, 26M, 26C, and 26K, respectively. Further, the image forming apparatus 100 includes a transfer device 2 and a fixing device 3. Incidentally, structures of the image forming portions PY, PM, PC, and PK are similar to each other, and therefore, in the following, description will be described using the image forming portion PY as a representative.

The photosensitive drum 28Y as an image bearing member is a photosensitive member, having a photosensitive layer formed of a resin such as polycarbonate, containing an organic photoconductor (OPC), and is constituted so as to be rotated at a predetermined speed. The primary charger 21Y includes a corona discharge pole disposed at a periphery of the photosensitive drum 28Y and electrically charges a surface of the photosensitive drum 28Y by generated ions.

In the optical write portion 22Y, a scanning optical device is assembled, and by exposing the charged photosensitive drum 28Y to light on the basis of image data, a potential of an exposed portion is lowered, so that a charge pattern (electrostatic latent image) corresponding to the image data is formed. The developing device 1Y develops the electrostatic latent image, formed on the photosensitive drum 28Y, by transferring a developer accommodated therein onto the photosensitive drum 28Y. The developer is prepared by mixing a carrier with toner of an associated color, and the electrostatic latent image is visualized (developed) with the toner.

The transfer device 2 includes primary transfer rollers 23Y, 23M, 23C, and 23K, an intermediary transfer belt 24, and a secondary transfer roller 25. The intermediary transfer belt 24 is wound around the primary transfer rollers 23Y, 23M, 23C, and 23K and a plurality of rollers, and is supported so as to be travelable.

The primary transfer rollers 23Y, 23M, 23C, and 23K are disposed in a named order from above in FIG. 1 and correspond to the colors of Y (yellow), M (magenta), C (cyan), and K (black), respectively. The secondary transfer roller 25 is disposed outside the intermediary transfer belt 24 and is constituted so that a recording material is capable of passing through between the secondary transfer roller 25 and the intermediary transfer belt 24. Incidentally, the recording material is a sheet such as paper or a plastic sheet.

The toner images of the respective colors formed on the photosensitive drums 28Y, 28M, 28C, and 28K are successively transferred onto the intermediary transfer belt 24 by the primary transfer rollers 23Y, 23M, 23C, and 23K, respectively, so that a color toner image including superimposed layers of the colors of yellow, magenta, cyan, and black. The thus-formed toner image is transferred by the secondary transfer roller 25 onto the recording material fed from a cassette in which recording materials are accommodated. The recording material on which the toner image is transferred is pressed and heated in the fixing device 3. By this, the toner on the recording material is melted, so that the color image is fixed on the recording material.

Developer storage portions 27Y, 27M, 27C, and 27K are provided correspondingly to the developing devices 1Y, 1M, 1C, and 1K, respectively, and in which bottles accommodating developers corresponding to the colors of yellow, magenta, cyan, and black are exchangeably mounted in a named order from above, respectively. The developer storage portions 27Y, 27M, 27C, and 27K are constituted so that the developers are capable of being fed (supplied) therefrom to the developing devices 1Y, 1M, 1C, and 1K corresponding to the colors of the developers stored therein, respectively.

For example, a toner weight ratio of the developer accommodated in each bottle is 80 to 95%, and a toner weight ratio of the developer in each of the developing devices 1Y, 1M, 1C, and 1K is 5 to 10%. For that reason, when the toner is consumed by development in each of the developing devices 1Y, 1M, 1C, and 1K, the developer containing the toner in an amount corresponding to a consumption amount of the toner is supplied, so that the toner weight ratio of the developer in each of the developing devices 1Y, 1M, 1C, and 1K is maintained in a constant amount.

[Developing Device]

Next, the developing devices 1Y, 1M, 1C, and 1K will be specifically described using FIGS. 2 to 5.

Figure 2:
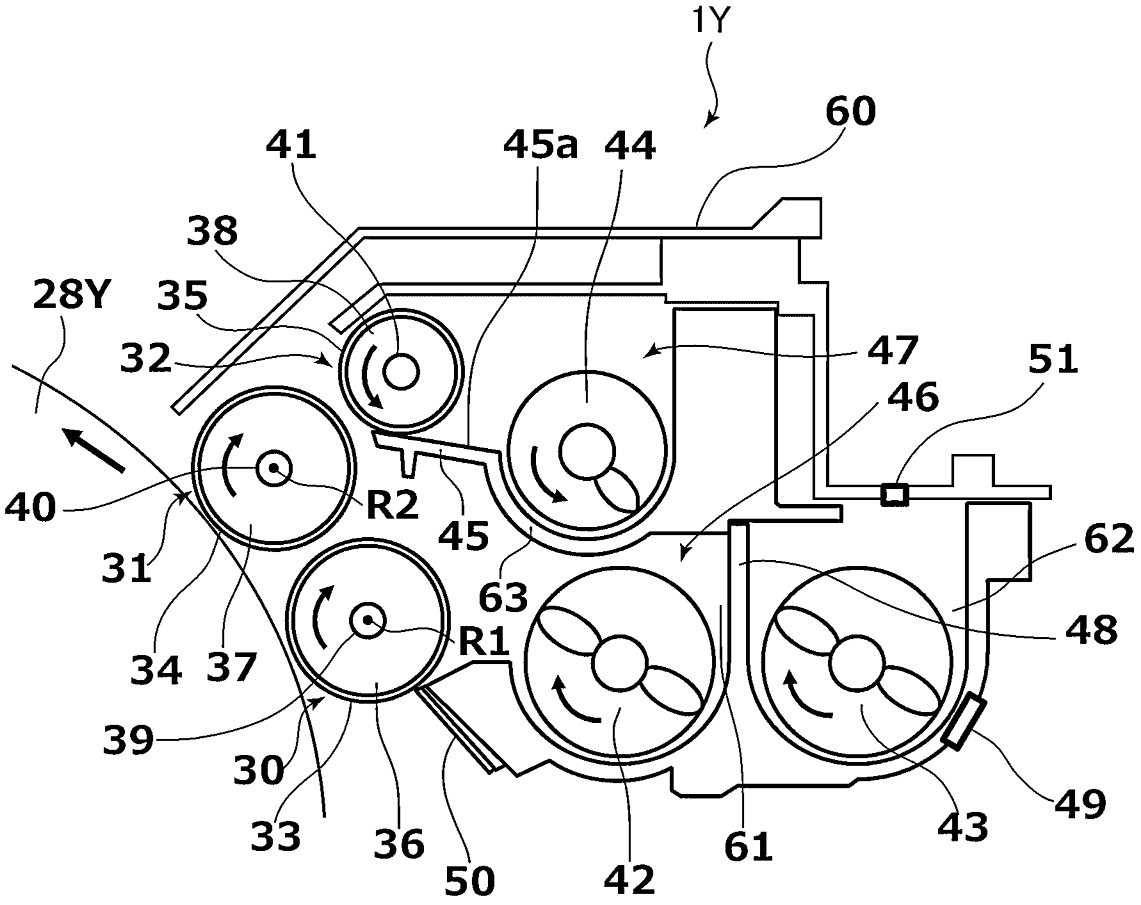
FIG. 2 is a schematic sectional view of a developing device according to the first embodiment.

Incidentally, structures of the developing devices 1Y, 1M, 1C, and 1K are the same, and therefore, in the following, the developing device 1Y will be described as a representative. FIG. 2 is a conceptual view illustrating the developing device 1Y shown in FIG. 1, and FIGS. 3 to 5 are conceptual views illustrating magnetic pole structures of a first magnet 36, a second magnet 37, and a third magnet 38 which are provided inside the developing device 1Y, respectively.

The developing device 1Y includes, as shown in FIG. 2, a first developing roller 30, a second developing roller 31, a peeling roller 32, a developer supplying screw 42, a developer stirring screw 43, and a developer collecting screw 44, and these members are accommodated in a developing container 60.

The first developing roller 30 is a developer carrying member which is rotationally driven, and is provided at a position adjacent to the photosensitive drum 28Y so that a rotational axis thereof is substantially parallel to a rotational axis of the photosensitive drum 28Y. The first developing roller 30 includes a first sleeve 33 which is rotatable, and the first magnet (fixed magnet) 36 non-rotationally provided inside the first sleeve 33 and for attracting the developer to a surface of the first sleeve 33 by a magnetic force. Then, the first developing roller 30 attracts (carries) the developer, scooped from the developer supplying screw 42, on the basis of the magnetic force, and develops the electrostatic latent image formed on the rotating photosensitive drum 28Y (image bearing member), with the developer.

The first sleeve 33 is a non-magnetic cylindrical member and is rotationally driven about a rotation shaft 39. A rotational direction of the first sleeve 33 is the clockwise direction as indicated by an arrow in FIG. 2 and is a direction opposite to a rotational direction of the photosensitive drum 28. For this reason, the first sleeve 33 and the photosensitive drum 28Y rotate in the same direction at mutually opposing positions. That is, normal (forward) development such that the photosensitive drum 28 is rotated from below toward above in a vertical direction in the position where the photosensitive drum 28 opposes the first sleeve 33 is performed.

Figure 3:
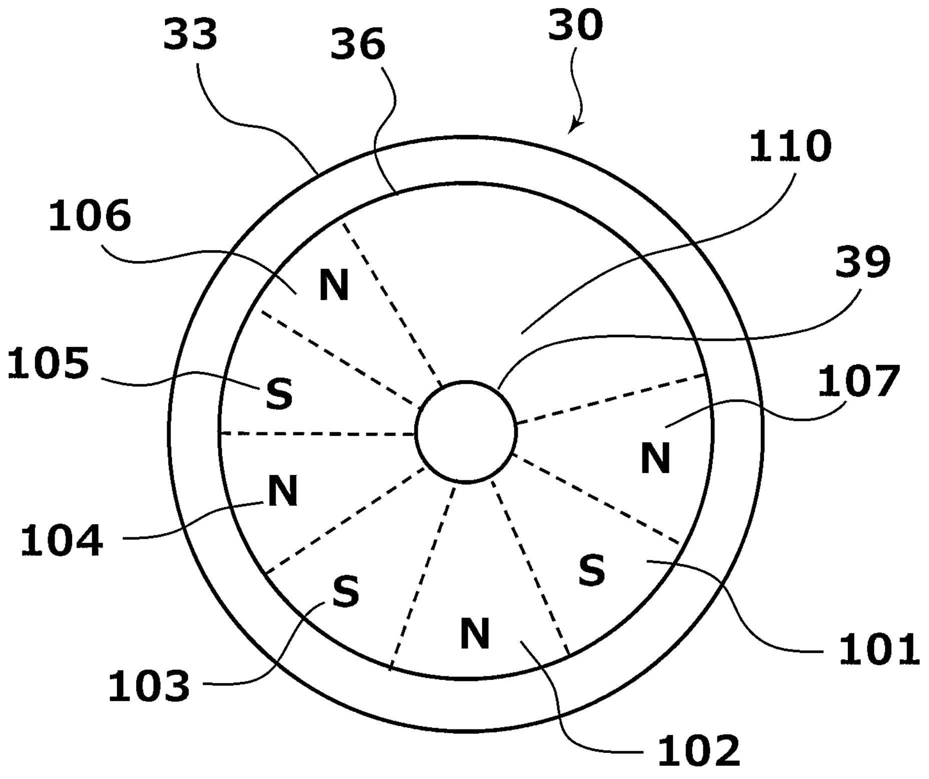
FIG. 3 is a schematic view showing a magnetic pole arrangement of a first developing roller in the first embodiment.

The first magnet 36 is disposed inside the first sleeve 33 and includes, as shown in FIG. 3, a plurality of sector magnetic poles 101 to 107. Between an inner periphery of the first sleeve 33 and an outer periphery of the first magnet 36, a space permitting rotation of the first sleeve 33 is provided.

The developer attracted onto the first sleeve 33 is conveyed toward the photosensitive drum 28Y by a rotation operation of the first sleeve 33, so that the electrostatic latent image formed on the photosensitive drum 28Y is developed with the developer. After the electrostatic latent image formed on the photosensitive drum 28Y is developed with the developer, the developer on the first sleeve 33 is conveyed to the neighborhood of the second developing roller 31 by the rotation operation of the first sleeve 33. Then, in the neighborhood of a closest position between the first developing roller 30 and the second developing roller 31, the developer is peeled off from the first sleeve 33 and then delivered to a surface of a second sleeve 34 by a magnetic field generated by the first magnet 36 included in the first developing roller 30 and by the second magnet 37 included in the second developing roller 31.

The second developing roller 31 is a developer carrying member which is rotationally driven and is provided downstream of the first developing roller 30 with respect to the rotational direction of the photosensitive drum 28Y, and a rotation center R2 of the second developing roller 31 is positioned above a rotation center R1 of the first developing roller 30 with respect to the vertical direction. To the second developing roller 31, the developer is delivered from the first developing roller 30 by the magnetic force (FIG. 2). In this embodiment, entirety of the second developing roller 31 is positioned above the rotation center R1 of the first developing roller 30.

The second developing roller 31 is, similarly as the first developing roller 30, provided at a position adjacent to the photosensitive drum 28Y so that a rotational axis thereof is substantially parallel to a rotational axis of the photosensitive drum 28Y. Accordingly, the second developing roller 31 and the first developing roller 30 are substantially parallel to each other in rotational axis.

Such a second developing roller 31 includes a second sleeve 34 which is rotatable, and the second magnet (fixed magnet) 37 non-rotationally provided inside the second sleeve 34 and for attracting the developer to a surface of the second sleeve 34 by a magnetic force. Then, on the basis of the magnetic force, to the second developing roller 31, the developer is delivered from the first developing roller 30 (the first sleeve 33), and the second developing roller 31 attracts (carries) the developer, and develops the electrostatic latent image formed on the rotating photosensitive drum 28Y, with the developer. Incidentally, on a side of the second developing roller 31, the peeling roller 32 described later is positioned.

The second sleeve 34 is a non-magnetic cylindrical member and is rotationally driven about a rotation shaft 40. A rotational direction of the second sleeve 34 is the clockwise direction as indicated by an arrow in FIG. 2 similarly as the first sleeve 33 and is a direction opposite to a rotational direction of the photosensitive drum 28 in this embodiment. For this reason, the second sleeve 34 and the photosensitive drum 28Y rotate in the same direction at mutually opposing positions. That is, normal development such that the photosensitive drum 28 is rotated from below toward above in the vertical direction in the position where the photosensitive drum 28 opposes the second sleeve 34 is performed. Further, the first sleeve 33 and the second sleeve 34 rotate in opposite directions at mutually opposing positions.

Figure 4:
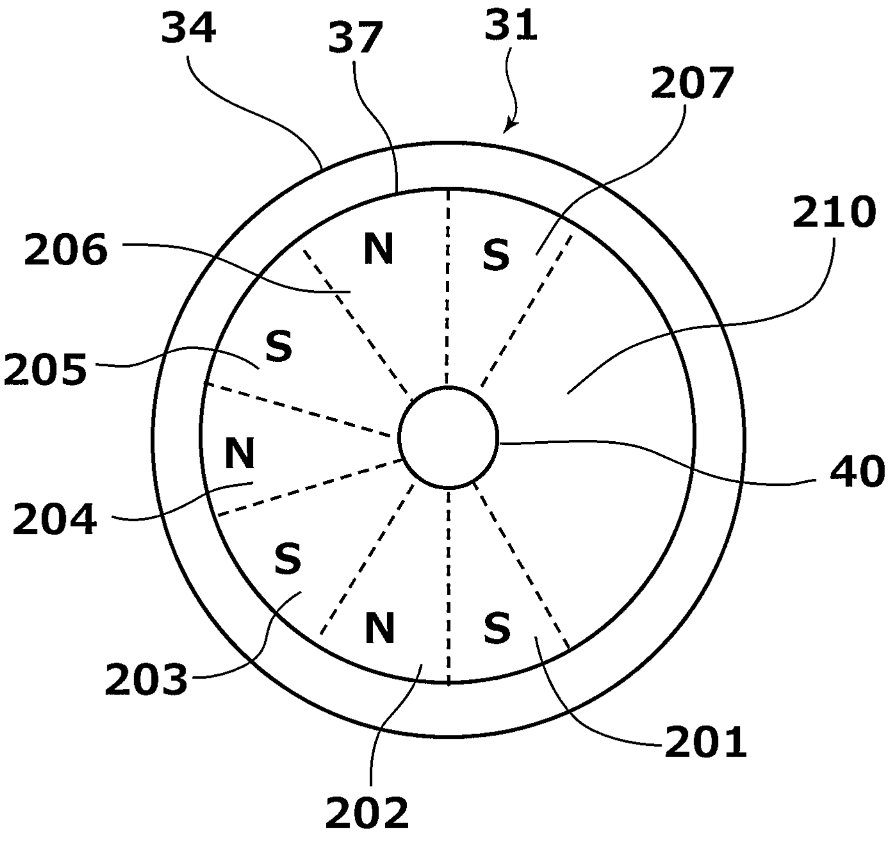
FIG. 4 is a schematic view showing a magnetic pole arrangement of a second developing roller in the first embodiment.

The second magnet 37 is disposed inside the second sleeve 34 and includes, as shown in FIG. 4, a plurality of sector magnetic poles 201 to 207. Between an inner periphery of the second sleeve 34 and an outer periphery of the second magnet 37, a space permitting rotation of the second sleeve 34 is provided.

The developer attracted onto the second sleeve 34 is conveyed toward the photosensitive drum 28Y by a rotation operation of the second sleeve 34, so that the electrostatic latent image formed on the photosensitive drum 28Y is developed with the developer. After the electrostatic latent image formed on the photosensitive drum 28Y is developed with the developer, the developer remaining on the second sleeve 34 is conveyed to the neighborhood of the peeling roller 32 by the rotation operation of the second sleeve 34. Then, in the neighborhood of a closest position between the second developing roller 31 and the peeling roller 32, the developer is delivered from the second sleeve 34 to a third sleeve 35 of the peeling roller 32 by a magnetic field generated by the second magnet 37 included in the second developing roller 31 and by the third magnet 38 included in the peeling roller 32.

The peeling roller 32 as a peeling portion is provided on a side opposite from the photosensitive drum 28Y with respect to a rotation center of the second sleeve 34 and peels off, from the second developing roller 31, the developer after the electrostatic latent image on the photosensitive drum 28Y is developed by the second developing roller 31. Specifically, the peeling roller 32 is a developer carrying member which is rotationally driven, and is provided between the second developing roller 31 and the developer collecting screw 44 so that a rotation center thereof is positioned above the rotation center R2 of the second developing roller 31.

Further, the peeling roller 32 is disposed so that a rotational axis thereof is substantially parallel to a rotational axis of the second developing roller 31. Such a peeling roller 32 includes a third sleeve 35 which is rotatable, and the third magnet (fixed magnet) 38 non-rotationally provided inside the third sleeve 35 and for attracting the developer to a surface of the third sleeve 35 by a magnetic force, and is constituted so that the developer is delivered from the second developing roller 31 thereto on the basis of the magnetic force.

The third sleeve 35 is a non-magnetic cylindrical member and is rotationally driven about a rotation shaft 41. A rotational direction of the third sleeve 35 is the counterclockwise direction as indicated by an arrow in FIG. 2 and is a direction opposite to a rotational direction of the second sleeve 34. For this reason, the third sleeve 35 and the second sleeve 34 rotate in the same direction at mutually opposing positions.

Figure 5:
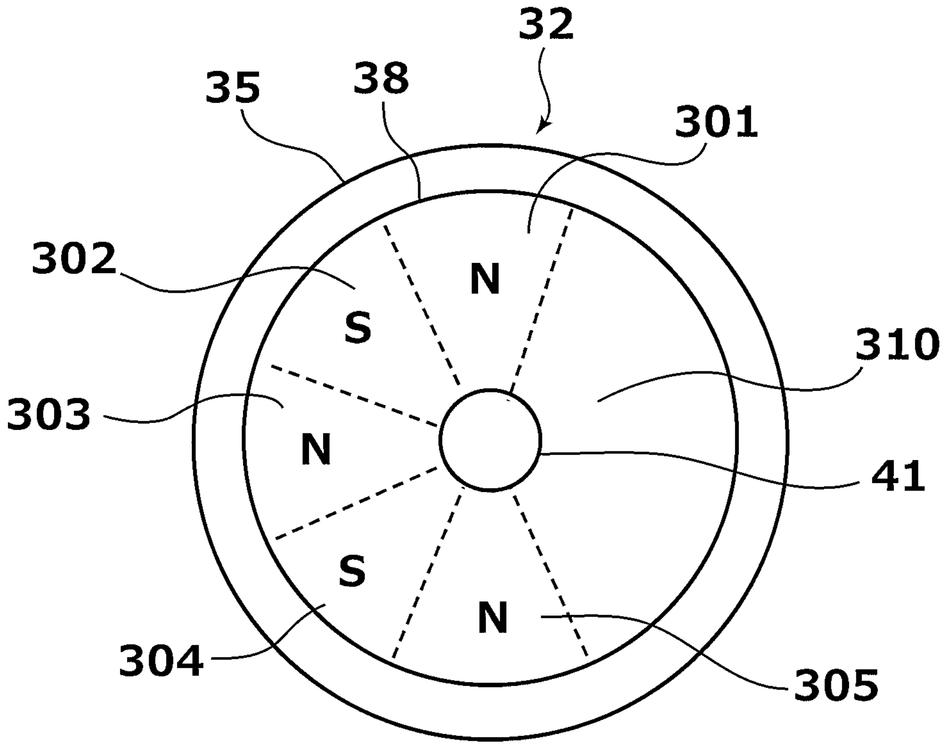
FIG. 5 is a schematic view showing a magnetic pole arrangement of a peeling roller in the first embodiment.

The third magnet 38 is disposed inside the third sleeve 35 and includes, as shown in FIG. 5, a plurality of sector magnetic poles 301 to 305. Between an inner periphery of the third sleeve 35 and an outer periphery of the third magnet 38, a space permitting rotation of the third sleeve 35 is provided.

The developer attracted to the third sleeve 35 is conveyed to a downstream side of the rotational direction by a rotation operation of the third sleeve 35 is peeled off from the third sleeve 35 at a position close to the developer collecting screw 44 by the third magnet 38 included in the peeling roller 32, so that the developer is dropped toward a guiding member 45 positioned below with respect to the vertical direction, by a self-weight thereof. Then, the developer dropped on the guiding member 45 is guided toward the developer collecting screw 44 by its own weight.

The guiding member 45 and the developer collecting screw 44 constitute a developer collecting portion 47 as a collecting portion for collecting the developer peeled off from the third sleeve 35 on the peeling roller 32. In the developer collecting portion 47, the developer collecting screw 44 is disposed so that a rotation center thereof is positioned below a rotation center of the peeling roller 32 in the vertical direction, and conveys the developer delivered (collected) from the peeling roller 32, while stirring the developer.

The guiding member 45 as a guiding portion is disposed below the peeling roller 32 with respect to the vertical direction, and guides the developer, peeled off by the peeling roller 32, toward the developer collecting screw 44. Such a guiding member 45 is provided with an inclined surface 45*a* along which the developer slides down by its own weight in order to reliably guide the peeled developer toward the developer collecting screw 44. The inclined surface 45*a* is inclined with respect to a horizontal direction so that a position thereof on the developer collecting screw 44 side is lower than a lower position of the peeling roller 32.

The developer collecting screw 44 as a collecting member and a conveying (feeding) portion conveys the collected developer to a developer circulating portion 46 described below. That is, the developer collecting screw 44 is a screw conveying (feeding) member used for conveying the developer, collected by being slide down along the inclined surface 45*a* of the guiding member 45, in one direction while stirring the developer.

The developer circulating portion 46 is a supplying portion for supplying the developer to the first developing roller 30, and the developer circulating portion 46 includes a regulating member 50, the developer supplying screw 42, and the developer stirring screw 43. In the developer circulating portion 46, the developer is supplied to the first developing roller 30 while the developer is conveyed in the substantially horizontal direction while being stirred in the developer supplying screw 42 and the developer stirring screw 43. Further, as described above, the developer collected by the developer collecting portion 47 is dropped by its own weight and is guided to the developer circulating portion 46.

The developer supplying screw 42, the developer stirring screw 43, and the developer collecting screw 44 are screw conveying members for conveying the developer in one direction while stirring the developer, and the developer supplying screw 42 and the developer stirring screw 43 are positioned below the developer collecting screw 44 with respect to the vertical direction. Further, the developer supplying screw 42, the developer stirring screw 43, and the developer collecting screw 44 are disposed so that their rotational axes are substantially parallel to each other. The rotational axes of these screws are also substantially parallel to the rotational axis of the first developing roller 30.

The developer supplying screw 42 is positioned between the first developing roller 30 and the developer stirring screw 43, and between itself and the developer stirring screw 43, a partition wall 48 of the developing container 60 is provided. The partition wall 48 of the developing container 60 is extended along rotational axis directions of the developer supplying screw 42 and the developer stirring screw 43. The partition wall 48 is provided with a communication opening (not shown) for establishing communication between a first feeding path 61 along which the developer is fed by the developer supplying screw 42 and a second feeding path 62 along which the developer is fed by the developer stirring screw 43 is provided.

The developer stirred by the developer collecting screw 44 passes through a communication opening (not shown) formed in a partition wall 63 of the developing container 60 positioned between the developer collecting screw 44 and the developer supplying screw 42 and then is dropped toward the developer supplying screw 42 by its own weight. The above-described guiding member 45 is formed integrally with the partition wall 63, and above the partition wall 63, the developer collecting screw 44 is disposed.

A position of the communication opening through which the developer stirred by the developer collecting screw 44 is dropped by its own weight and is guided into the developer circulating portion 46 may preferably be disposed while avoiding a region (an intermediary portion with respect to the rotational axis direction of the developer supplying screw 42) in which the developer is supplied toward the first developing roller 30. In this embodiment, the position of the communication opening is a position where the communication opening position is included in a range of a downstream end portion (terminal portion) with respect to a developer feeding direction of the first feeding path 61 in which the developer supplying screw 42 is disposed.

Developer feeding directions of the developer supplying screw 42 and the developer stirring screw 43 are mutually opposite directions. Further, a starting end side (upstream end side in the developer feeding direction) and a terminal end side (downstream end side in the developer feeding direction) of the first feeding path 61 in which the developer supplying screw 42 is disposed, and a terminal end side and a starting end side of the second feeding path 62 in which the developer stirring screw 43 is disposed communicate with each other, respectively, via communication openings provided in the partition wall 48. Accordingly, the developer is circulated in the rotational directions of the developer supplying screw 42 and the developer stirring screw 43 indicated by arrows in FIG. 2 and in the substantially horizontal direction in the developing container 60, so that a part of the developer is supplied toward the first developing roller 30.

A developer supply opening 51 (see FIG. 2) is provided above the developer stirring screw 43 in the developing container 60 and is connected to the developer storage portion 27Y (see FIG. 1). Further, the developer supply opening 51 is constituted so as to be capable of supplying the developer, accommodated in a bottle mounted in the developer storage portion 27Y, to the second feeding path 62 in which the developer stirring screw 43 is disposed.

As described above, a toner weight ratio of the developer accommodated in the bottle of the developer storage portion 27Y is larger than a toner weight ratio of the developer in the developing device 1Y, and therefore, by adjusting an amount of the developer supplied to the developer stirring screw 43, the toner weight ratio of the developer in the developing device 1Y can be maintained at a certain level.

A toner concentration detecting sensor 49 (see FIG. 2) is provided for detecting a toner concentration of the developer contained in the developer circulating portion 46. The toner concentration detecting sensor 49 is a sensor for detecting (magnetic) permeability. The toner concentration corresponds to a consumption amount of the toner in the developing device 1Y, and therefore, is utilized in control of supply of the developer from the developer storage portion 27Y. For example, when the toner concentration is detected that the toner concentration is lowered than a predetermined value, the developer is supplied from the developer storage portion 27Y. Incidentally, the permeability changes depending on the toner concentration, and therefore, by utilizing the permeability, it is possible to detect the toner concentration.

The regulating member 50 is disposed adjacent to the first developing roller 30 and is used for regulating an amount of the developer supplied from the developer circulating portion 46 to the first developing roller 30. The regulating member 50 can be constituted so as to regulate an amount of the developer attracted to the first developing roller 30, on the basis of a gap between the surface of the first sleeve 33 of the first developing roller 30 and an end portion of the regulating member 50.

A circulating path of the developer in the developing container 60 is such that the developer is fed in the substantially horizontal direction while being stirred in the developer circulating portion 46 and thereafter is supplied to the first developing roller 30, and then is delivered from the first developing roller 30 to the second developing roller 31 positioned above the first developing roller 30, on the basis of the magnetic force. Then, the developer is delivered from the second developing roller 31 to the peeling roller 32 positioned beside the second developing roller 31, on the basis of the magnetic force again, and thereafter, is peeled off from the peeling roller 32 by the third magnet 38 included in the peeling roller 32. Further, the developer is collected by the developer collecting portion 47 and then is guided again into the developer circulating portion 46.

Further, as described above, in this embodiment, a two-component development type is used as a development type, and as the developer, a developer obtained by mixing non-magnetic toner having a negative charging property with a carrier having a magnetic property is used. The non-magnetic toner is toner obtained by containing a colorant, a wax component, and the like in a resin such as polyester or styrene-acrylic resin, by forming the mixture in powder through pulverization or polymerization, and then by adding fine powder of titanium oxide, silica, or the like to a surface the powder. The magnetic carrier is a carrier obtained by coating a resin material on a surface layer of a core comprising ferrite particles or resin particles obtained by kneading or with magnetic powder. The toner concentration in the developer (a weight ratio of the toner to the developer) in an initial state is 8% in this embodiment.

In general, the two-component development type using the toner and the carrier has a feature such that stress exerted on the toner is less than stress exerted on the toner in a one-component development type using a one-component developer because the toner and the carrier are charged to predetermined polarities by subjecting the toner and the carrier to triboelectric contact. On the other hand, by long-term use, an amount of a contaminant (spent) deposited on the carrier surface increases, and therefore, toner charging capacity gradually lowers. As a result, problems of a fog and a toner scattering arise. Although it would be considered that an amount of the carrier accommodated in the developing device is increased in order to prolong a lifetime of the two-component developing device, this causes upsizing of the developing device, and therefore is not desirable.

In order to solve the above-described problems on the two-component developer, in this embodiment, an ACR (auto carrier refresh) type is employed. The ACR type is a type such that an increase in amount of a deteriorated developer is suppressed by not only supplying a fresh developer little by little from the developer storage portion 27Y into the developing device 1Y but also discharging the developer, deteriorated in charging performance, little by little through a discharge opening (not shown) of the developing device 1Y. By this, the deteriorated carrier in the developing device 1Y is replaced little by little with a fresh carrier, so that the charging performance of the carrier in the developing device 1Y can be maintained at an approximately constant level.

[Magnetic Poles of Magnets]

Next, magnetic pole constitutions of the first magnet 36, the second magnet 37, and the third magnet 38 included in the first developing roller 30, the second developing roller 31, and the peeling roller 32, respectively, which are shown in FIGS. 3, 4, and 5, respectively, will be described.

As shown in FIG. 3, the first magnet 36 included in the first developing roller 30 has a 7-pole-based magnetic pole constitution including a plurality of magnetic poles 101, 102, 103, 104, 105, 106, and 107. Of these magnetic poles, the magnetic pole 106 is a delivering pole for delivering the developer from the first developing roller 30 to the second developing roller 31. The magnetic poles 101 to 107 are disposed in a named order in the rotational direction of the first sleeve 33.

Magnetic flux densities of the magnetic poles 101 to 107 in this embodiment are magnetic pole 101=290 gauss, magnetic pole 102=770 gauss, magnetic pole 103=1060 gauss, magnetic pole 104=1640 gauss, magnetic pole 105=870 gauss, magnetic pole 106=360 gauss, and magnetic pole 107=450 gauss, respectively.

The magnetic pole 101 is an S pole and is disposed in a position opposing the regulating member 50 through the first sleeve 33, and adjusts an amount of the developer conveyed on the first sleeve 33 as described above. The magnetic pole 104 as a first delivering pole is an N pole and is disposed in a position opposing the photosensitive drum 28Y through the first sleeve 33, and is a magnetic pole for developing the electrostatic latent image, formed on the photosensitive drum 28Y, with the developer. Hereinafter, the magnetic pole 104 is referred to as the first developing pole 104 in some cases.

The magnetic pole 106 as a delivering pole is the N pole and is a magnetic pole for delivering the developer from the first sleeve 33 to the second sleeve 34 by a magnetic field generated in cooperation with the second magnet 37 of the second developing roller 31, and is hereinafter referred to as a delivering pole 106 in some cases.

The magnetic pole 107 is the N pole and is used for attracting the developer, supplied from the developer supplying screw 42, to the first sleeve 33. The magnetic poles 102, 103, and 105 are the N pole, the S pole, and the N pole, respectively, and are used as feeding poles for feeding upward the developer attracted by the magnetic pole 107 with rotation of the first sleeve 33. Of these magnetic poles, the magnetic pole 105 is a first magnetic pole upstream of and adjacent to the delivering pole 106 with respect to the rotational direction of the first sleeve 33, and is hereinafter referred to as a first feeding pole 105 in some cases. The first developing pole 104 is positioned upstream of and adjacent to the first feeding pole 105 with respect to the rotational direction of the first sleeve 33.

Further, the magnetic pole 107 is disposed on a side downstream of the delivering pole 106 with respect to the rotational direction of the first sleeve 33 and has the same polarity as the delivering pole 106. The delivering pole 106 and the magnetic pole 107 form a low-magnetic force portion 110 lower in magnetic force than the delivering pole 106 by a repelling magnetic field therebetween in cooperation with each other. By this low-magnetic force portion 110, the developer is peeled off from on the first sleeve 33, and delivery of the developer from the first sleeve 33 to the second sleeve 34 is promoted. Incidentally, the low-magnetic force (portion 110 may have substantially no magnetic force in this embodiment, but may have a low magnetic force, and for example, may be a magnetic pole of 50 gauss or less in magnetic force (normal component Br of magnetic flux density). The same applies to a low-magnetic force portion 210 of the second magnet 37 shown in FIG. 4 and a low-magnetic force portion 310 of the third magnet 38 shown in FIG. 5.

As shown in FIG. 4, the second magnet 37 included in the second developing roller 31 has a seven-magnetic pole-based constitution including a plurality of magnetic poles 202, 203, 204, 205, 206 and 207. Of these, the magnetic pole 201 is a receiving pole for receiving the developer from the first developing roller 30 by the second developing roller 31. The magnetic poles 201 to 207 are disposed in a named order in the rotational direction of the second sleeve 34.

Magnetic flux densities of the magnetic poles 201 to 207 in this embodiment are magnetic pole 201=562 gauss, magnetic pole 202=820 gauss, magnetic pole 203=1560 gauss, magnetic pole 204=870 gauss, magnetic pole 205=720 gauss, magnetic pole 206=690 gauss, and magnetic pole 207=280 gauss, respectively.

The magnetic pole 201 as the receiving pole is a magnetic pole for attracting the developer from the first sleeve 33 to the second sleeve 34 by a magnetic field generated in cooperation with the magnetic pole 106 of the first magnet 36 of the first developing roller 30. The magnetic pole 207 is a magnetic pole for delivering the developer from the second sleeve 34 to the third sleeve 35 by a magnetic field generated in cooperation with the third magnetic 38 of the peeling roller 32.

Further, the magnetic pole 201 is the S pole different in polarity from the delivering pole 106 and is used for attracting the developer from the first developing roller 30 (first sleeve 33) to the second sleeve 34 as described above. The magnetic pole 203 as a second developing pole is the S pole and is a magnetic pole which is disposed in a position opposing the photosensitive drum 28Y through the second sleeve 34 and which is for developing the electrostatic latent image formed on the photosensitive drum 28Y. Hereinafter, the magnetic pole 203 is referred to as a second developing pole 203 in some cases.

The magnetic poles 202, 204, 205 and 206 are the N pole, the N pole, the S pole, and the N pole, and are used for feeding upward the developer attracted by the magnetic pole 201 with rotation of the second sleeve 34. Of these magnetic poles, the magnetic pole 202 is a second magnetic pole positioned downstream of and adjacent to the receiving pole 201 with respect to the rotational direction of the second sleeve 34, and is hereinafter referred to as a second feeding pole 202 in some cases. The second developing pole 203 is positioned downstream of and adjacent to the second feeding pole 202 with respect to the rotational direction of the second sleeve 34.

The magnetic pole 207 is the S pole and delivers the developer, after passing through a developing region with the photosensitive drum 28Y corresponding to the magnetic pole 203, from the second sleeve 34 to the third sleeve 35 opposing the second sleeve 34 by a magnetic field generated in cooperation with a magnetic pole 303 in the third magnet 38 included in the peeling roller 32.

Further, the magnetic pole 207 is disposed on a side upstream of the receiving pole 201 with respect to the rotational direction of the second sleeve 34 and has the same polarity as the receiving pole 201. The receiving pole 201 and the magnetic pole 207 form the low-magnetic force portion 210 lower in magnetic force than the magnetic pole 207 by a repelling magnetic field generated in cooperation with each other. By this low-magnetic force portion 210, the developer is peeled off from on the second sleeve 34, and delivery of the developer from the first sleeve 33 to the second sleeve 34 is promoted. Further, by the low-magnetic force portion 210, it is possible to prevent attraction of the developer to a closest portion between the first sleeve 33 and the second sleeve 34, and pressure exerted on the developer can be suppressed.

As shown in FIG. 5, the third magnet 38 included in the peeling roller 32 is provided with a plurality of magnetic poles 301, 302, 303, 304, and 305. The magnetic poles 301 to 305 are disposed in a named order in the rotational direction of the third sleeve 35.

Magnetic flux densities of the magnetic poles 301 to 305 in this embodiment are magnetic pole 301=300 gauss, magnetic pole 302=650 gauss, magnetic pole 303=610 gauss, magnetic pole 304=610 gauss, and magnetic pole 305=540 gauss, respectively.

The magnetic pole 303 is the N pole different polarity from the magnetic pole 207 and is used for attracting the developer, peeled off from the second sleeve 34 as described above, to the third sleeve 35. The magnetic poles 301, 302, and 304 are the N pole, the S pole, and the S pole are used for feeding the developer on the third sleeve 35 with rotation of the third sleeve 35. Particularly, the magnetic pole 304 is used for feeding downward the developer attracted by the magnetic pole 303 with rotation of the third sleeve 35. The magnetic pole 305 is the N pole and is peeling pole used for peeling off the developer, attracted to the third sleeve 35, from the third sleeve 35 by a repelling magnetic field generated in cooperation with the magnetic pole 301 having the same polarity as the magnetic pole 305.

Figure 6:
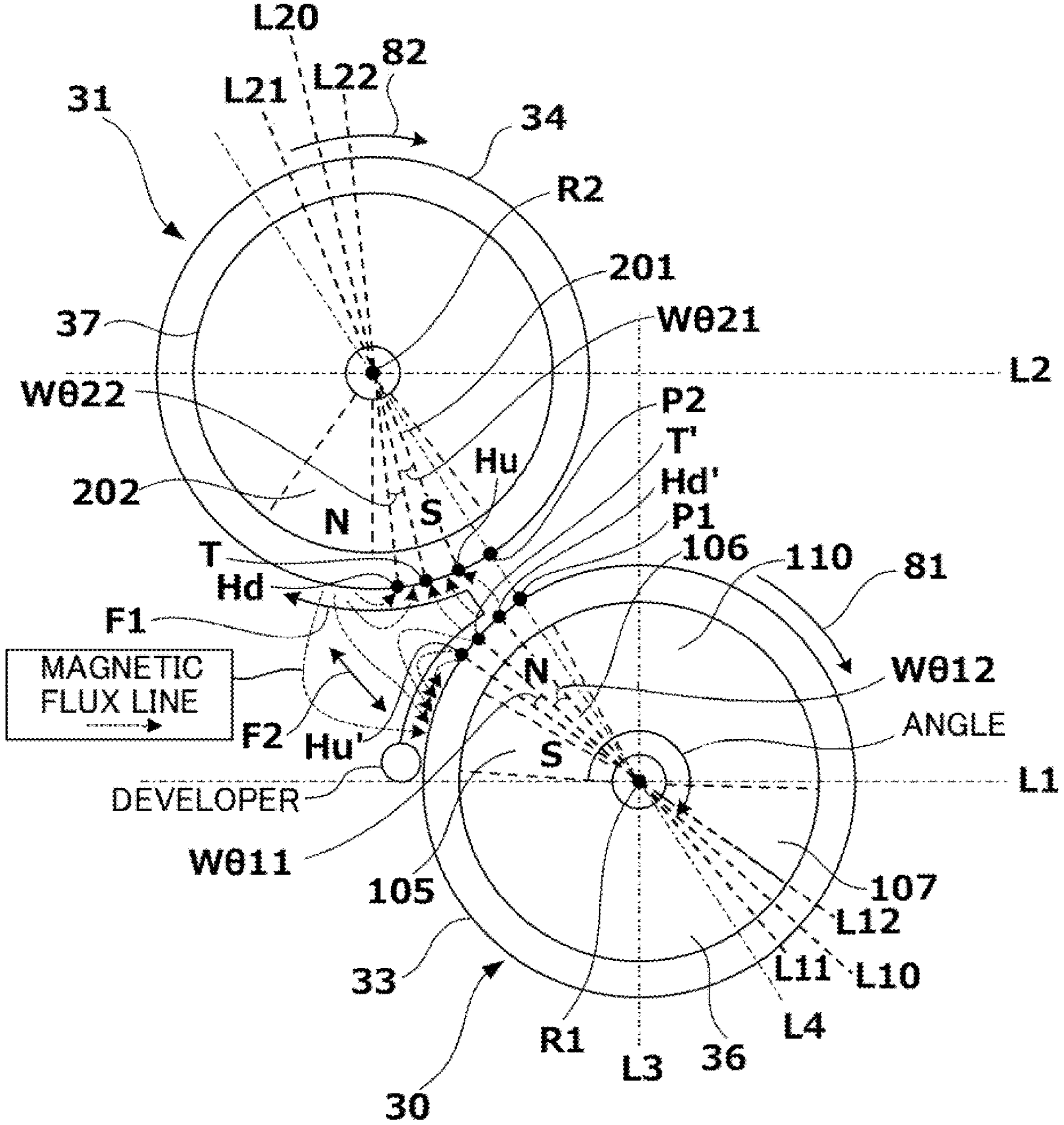
FIG. 6 is a schematic view showing a relationship of a magnetic pole arrangement between the first developing roller and the second developing roller in the first embodiment.
Figure 7:
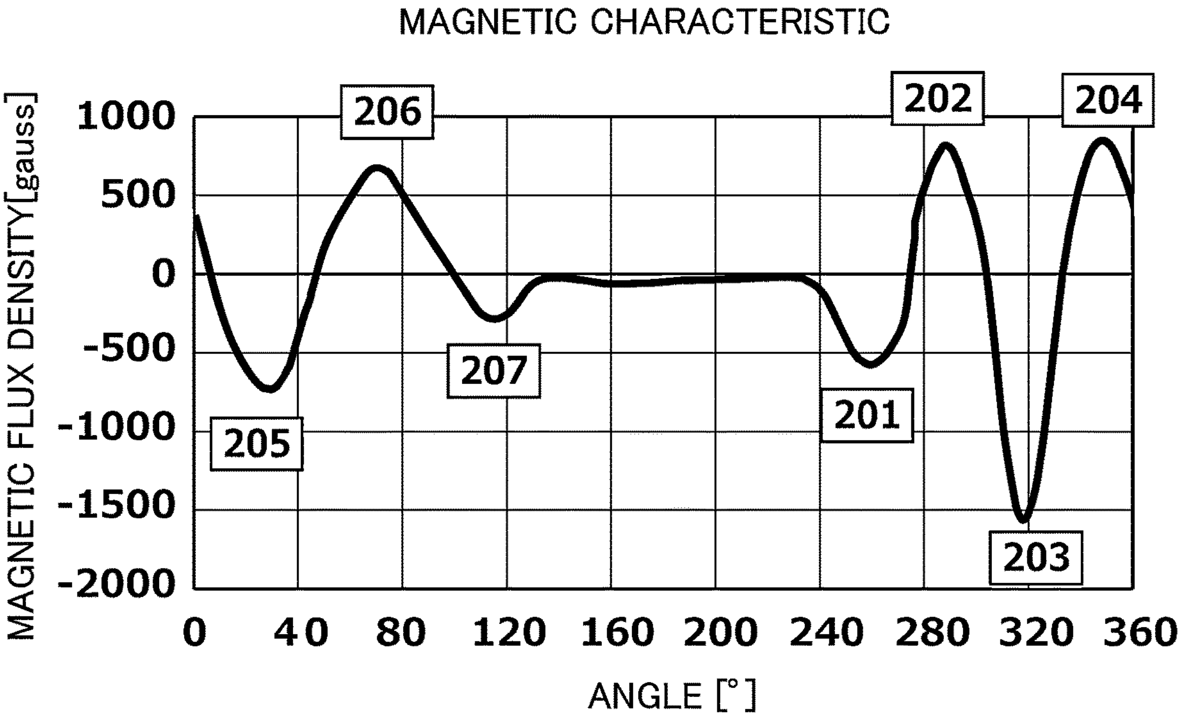
FIG. 7 is a graph showing a magnetic characteristic of the second developing roller in the first embodiment.
Figure 8:
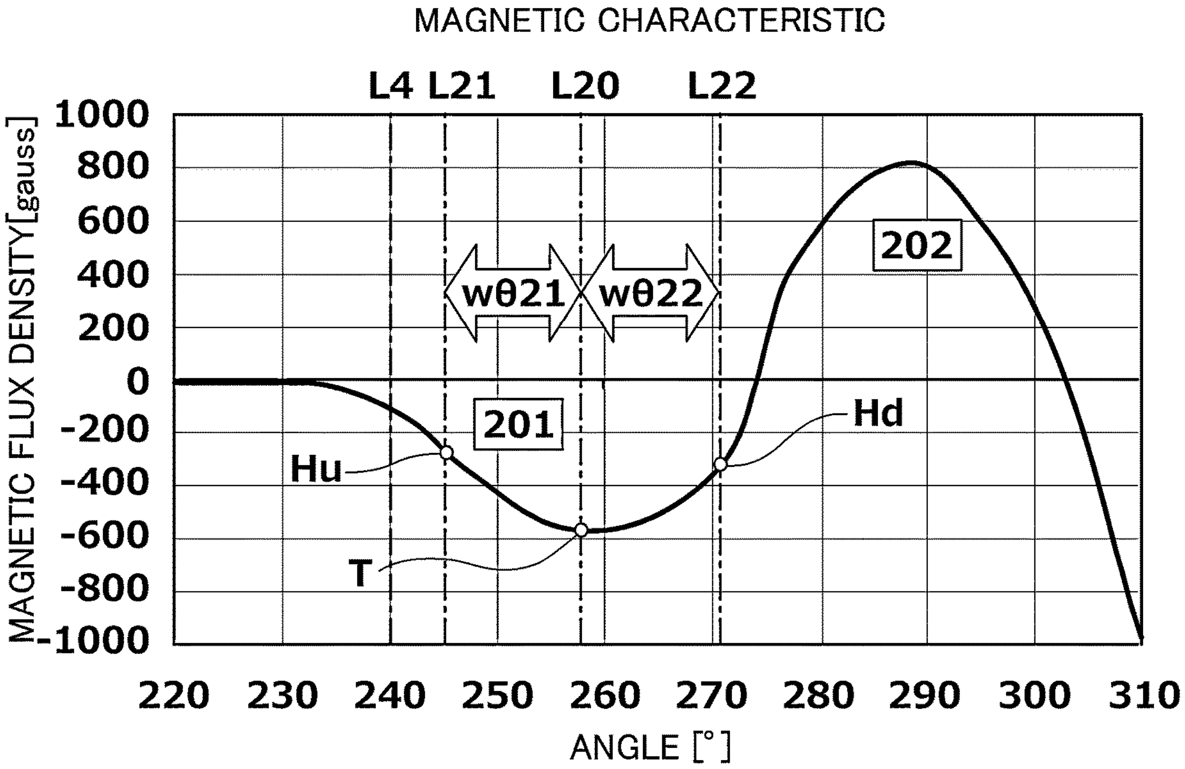
FIG. 8 is graph showing a magnetic characteristic at a periphery of a receiving pole of the second developing roller in the first embodiment.
Figure 9:
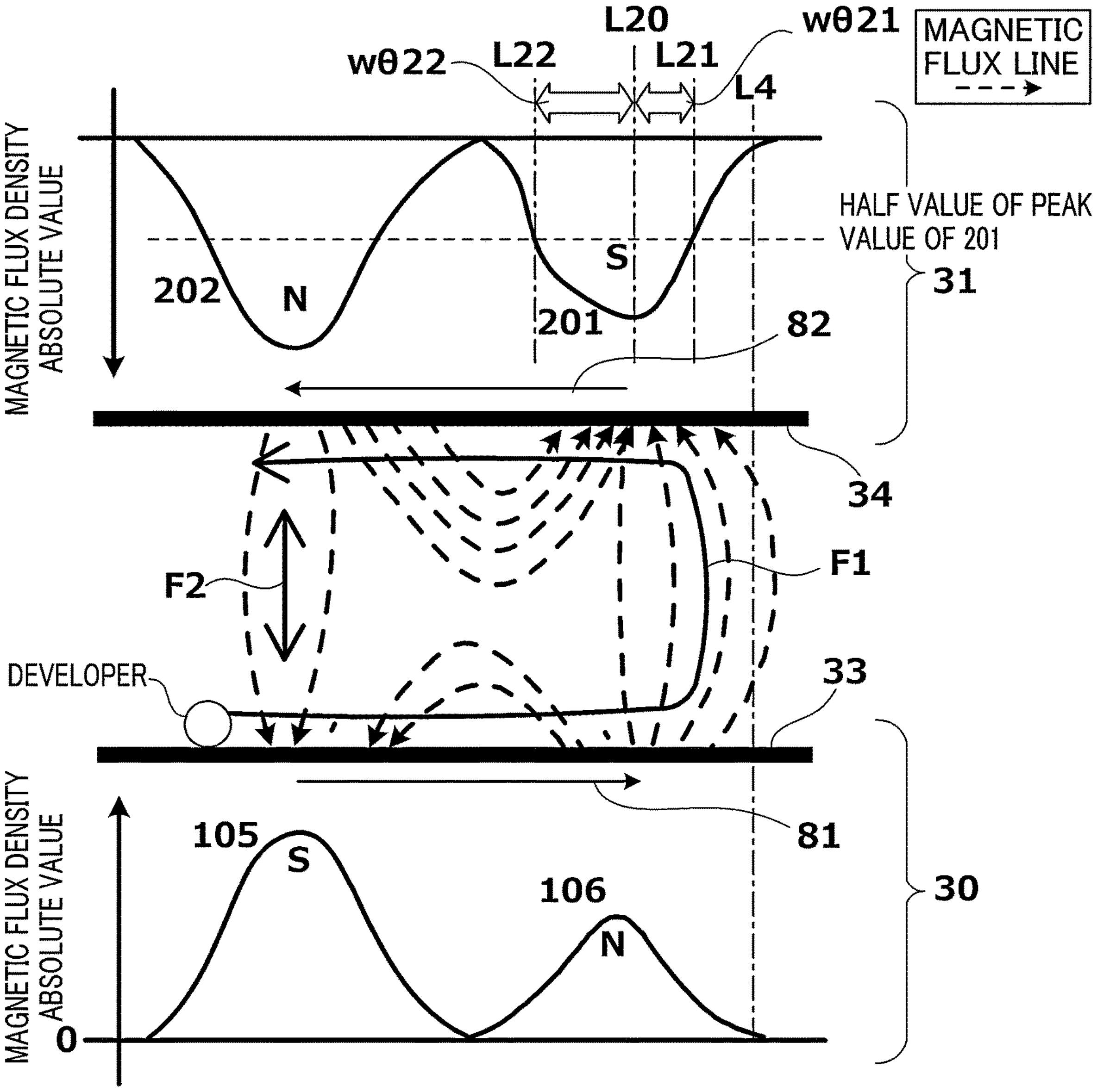
FIG. 9 is a schematic view for illustrating a state of magnetic flux lines and magnetic flux density between the first developing roller and the second developing roller in the first embodiment.

Next, a magnetic pole arrangement relationship between the first magnet 36 and the second magnet 37 disposed inside the first developing roller 30 and the second developing roller 31, respectively, will be described using FIGS. 6 to 9. FIG. 6 is a conceptual view for illustrating an arrangement of the first developing roller 30 and the second developing roller 31 in this embodiment, and particularly shows a layout of the first feeding pole 105 and the delivering pole 106 of the first magnet 36 of the first developing roller 30, and the receiving pole 201 and the second feeding pole 202 of the second magnet 37 of the second developing roller 31. Incidentally, due to complication, a part of the magnetic poles are omitted from display. Further, FIGS. 7 and 8 are graphs each showing a magnetic characteristic of the second magnet 37 of the first developing roller 30. FIG. 9 is a conceptual view for illustrating a magnetic field of the first developing roller 30 and the second developing roller 31 of this embodiment, and particularly, show absolute values of magnetic flux densities of the delivering pole 106, the first feeding pole 105, the receiving pole 201, and the second feeding pole 202, and states of magnetic flux lines (lines of magnetic flux) formed by these magnetic poles.

In this embodiment, as described above, the developer in the developing device 1Y is moved from the surface of the first sleeve 33 of the first developing roller 30 to the surface of the second sleeve 34 of the second developing roller 31 by magnetic fields of the delivering pole 106 in the first developing roller 30 and the receiving pole 201 in the second developing roller 31, and then is moved onto the surface of the third sleeve 35 of the peeling roller 32 after being used in a developing step of the electrostatic latent image on the photosensitive drum 28Y.

A process (arrow F1) in which the developer is delivered from on the first sleeve 33 of the first developing roller 30 onto the second sleeve 34 of the second developing roller 31 will be described. As indicated by the arrow F1 in FIGS. 6 and 9, the developer is moved to a downstream side of the rotational direction 81 of the first sleeve 33 rotating about the rotation center R1 by a magnetic force along magnetic flux lines extending from the first feeding pole 105 to the delivering pole 106 of the first magnet 36. Then, the developer is moved from on the first sleeve 33 onto the second sleeve 34 by a magnetic force along magnetic flux lines extending from the delivering pole 106 to the receiving pole 201. Further, the developer is moved toward a downstream side of the rotational direction 82 of the second sleeve 34 rotating about the rotation center R2 by a magnetic force along magnetic flux lines extending from the receiving pole 201 toward the second feeding pole 202.

Here, a position (peak position) of a maximum (value) (peak value) of a normal component of a magnetic flux density of the receiving pole 201 on the surface of the second sleeve 34 is taken as a point T (FIG. 8). Further, of half value positions of the maximum value of the normal component of the magnetic flux density of the receiving pole 201, an upstream side position with respect to the rotational direction of the second sleeve 34 is taken as Hu, and a downstream side position with respect to the rotational direction of the second sleeve 34 is taken as Hd. Further, rectilinear lines L1, L2, L3, L4, L20, L21, and L22 which are indicated by chain lines in FIGS. 6 and 8 are defined as follows:

L1: horizontal line passing through rotation center R1 of first sleeve 33, L2: horizontal line passing through rotation center R2 of second sleeve 34, L3: vertical line passing through rotation center R1 of first sleeve 33, L4: rectilinear line passing through rotation center R1 and rotation center R2, L20: rectilinear line connecting rotation center R2 and point T (magnetic flux density peak position of receiving pole 201) (FIG. 8), L21: rectilinear line connecting rotation center R2 and point Hu (upstream side position of half value of magnetic flux density peak value of receiving pole 201 with respect to rotational direction 82 of second sleeve 34) (FIG. 8), and L22: rectilinear line connecting rotation center R2 and point Hd (downstream side position of half value of magnetic flux density peak value of receiving pole 201 with respect to rotational direction 82 of second sleeve 34) (FIG. 8).

Feeding of the developer from the first feeding pole 105 to the delivering pole 106 of the first sleeve 33 is made by a force by rotation of the first sleeve 33 and a magnetic force along magnetic flux lines extending from the first feeding pole to the delivering pole 106. The peak value of the magnetic flux density of the delivering pole 106 is not more than a peak value (maximum of normal component) of the magnetic flux density of the receiving pole 201. Further, a magnetic field (delivering magnetic field) which is formed by the delivering pole 106 and the receiving pole 201 and which is for delivering the developer from the first sleeve 33 to the second sleeve 34 is constituted so that a repulsive force region in which the magnetic force in the direction of the rotation center R1 in the neighborhood of an outer peripheral surface of the first sleeve 33 becomes negative in polarity is generated in a range on a side upstream of a point P1 of intersection between the rectilinear line L4 and the first sleeve 33 (FIG. 6) and downstream of the magnetic flux density peak position (maximum value position of normal component on the surface of the first sleeve 33) of the first feeding pole 105 with respect to the rotational direction 81 of the first sleeve 33.

The delivering magnetic field is constituted so that an attracting force region in which the magnetic force in the direction of the rotation center R2 in the neighborhood of an outer peripheral surface of the second sleeve 34 becomes positive in polarity is generated in a range on a side downstream of a point P2 of intersection between the rectilinear line L4 and the second sleeve 34 (FIG. 6) and upstream of the magnetic flux density peak position of the second feeding pole 202 with respect to the rotational direction 82 of the second sleeve 34. By such a magnetic force relationship, delivery of the developer from the first sleeve 33 to the second sleeve 34 is carried out.

Incidentally, the magnetic flux lines extending from the second feeding pole 202 are connected to not only the receiving pole 201 but also the first feeding pole 105, of the first developing roller 30, constituted by the S pole different in polarity from the second feeding pole 202. When as regards a magnetic force acting on the developer on the second sleeve 34 in the neighborhood of the second feeding pole 202, a magnetic field between the first feeding pole 105 and the second feeding pole 202 becomes predominant over a magnetic field between the second feeding pole 202 and the receiving pole 201, as indicated by an arrow F2 in FIG. 6, movement of the developer from the first feeding pole 105 to the second feeding pole 202 or from the second feeding pole 202 to the first feeding pole 105 occurs. Further, the developer also contacts the photosensitive drum 28Y in the neighborhood of these magnetic poles, so that a fog image in a vertical stripe shape is generated on the photosensitive drum 28Y.

In order to suppress such a movement of the developer in the arrow F2 direction, it may only be required that the magnetic field between the first feeding pole 105 and the second feeding pole 202 is weakened and that the magnetic field between the second feeding pole 202 and the receiving pole 201 is strengthened. As a method therefor, a method in which the magnetic flux density peak value of the receiving pole 201 is increased would be considered. However, when the magnetic flux density peak value of the receiving pole 201 is increased, a force for constraining the developer in the neighborhood of a closest position between the first sleeve 33 and the second sleeve 34 becomes strong and thus pressure is exerted on the developer, so that deterioration of the developer is accelerated. When the developer is deteriorated, a charge amount of the toner lowers, so that there is a liability that the electrostatic latent image cannot be developed on the photosensitive drum 28Y with the toner in an appropriate amount.

For the above-described reasons, it is not preferable that the magnetic flux density peak value of the receiving pole 201 is simply increased. Further, the delivery of the developer is carried out between the delivering pole 106 and the receiving pole 201, and therefore, ordinarily, downstream of the delivering pole 106, the magnetic pole 107 which has the same polarity and which is a repelling pole is disposed, and upstream of the receiving pole 201, the magnetic pole 207 which has the same polarity and which is a repelling pole is disposed. For that reason, a half-value width of the delivering pole 106 on the downstream side and a half-value width of the receiving pole 201 on the upstream side are liable to become wide. For that reason, the magnetic field acting between the delivering pole 106 and the first feeding pole 105 and the magnetic field acting between the receiving pole 201 and the second feeding pole 202 become weak. In the case where in order to narrow the half-value width, on the side downstream of the delivering pole 106 or on the side upstream of the receiving pole 201, the magnetic pole which has the same polarity and which is the repelling pole is added, movement of the developer on the associated sleeve occurs, and therefore, it is not preferable that such a magnetic pole is disposed.

Therefore, in this embodiment, the receiving pole 201 is set as follows. First, as shown in FIG. 8, of half-value widths of the magnetic flux density peak value of the receiving pole 201, an angle formed by the rectilinear lines L20 and L21, which is a width on a side upstream of the magnetic flux density peak position of the receiving pole 201 is taken as an angle wθ21, and an angle, formed by the rectilinear lines L20 and L21, which is a width on a side downstream of the magnetic flux density peak position of the receiving pole 201 is taken as wθ22. Further, an angle difference (wθ22−wθ21) of the angle wθ21 relative to the angle wθ22 is Δwθ, i.e., Δwθ=wθ22−wθ21. In this case, the receiving pole 201 is set to satisfy: Δwθ≥0.

By this, the magnetic field between the first feeding pole 105 and the second feeding pole 202 is weakened, and the magnetic field between the second feeding pole 202 and the receiving pole 201 is strengthened. Further, a feeding property of the developer from the first feeding pole 105 to the delivering pole 106 of the first sleeve 33 is improved. As a result of this, it becomes possible to suppress movement of the developer between the first feeding pole 105 of the first developing roller 30 and the second feeding pole 202 of the second developing roller 31.

A magnetic property distribution of the second magnet 37 in this embodiment is shown in each of FIGS. 7 to 9. A graph of FIG. 7 shows positions with respect to an angle direction of the second sleeve 34 and magnitudes of magnetic flux densities in a normal direction, of the magnetic poles 201 to 207 included in the second magnet 37 shown in FIGS. 3 and 6. In FIG. 7, an abscissa represents an angle (indicated by an arrow in FIG. 6) of the second magnet 37 with respect to the rotational direction of the second sleeve 34 when a position on the photosensitive drum 28Y side relative to the horizontal line L2 on the rotation center R2 of the second developing roller 31 is taken as 0 degrees. In FIG. 7, an ordinate represents a measurement result of the magnetic flux density of the second magnet 37 with respect to the normal direction at an associated angle of the second magnet 37 with respect to the rotational direction.

FIG. 8 shows a portion in the neighborhood of the receiving pole 201 and the second feeding pole 202 in FIG. 7 in an enlarged manner, in which the rectilinear lines L4 and L20 to L22 on the above-described second sleeve 34 are indicated by chain lines, and magnitudes of the angles wθ21 and wθ22 are indicated by double-pointed arrows in FIG. 8. In the second magnet 37 in this embodiment, the receiving pole 201 is set to provide the angle wθ21=12 degrees and the angle wθ22=15 degrees so as to satisfy an angle difference Δwθ=3 degrees. Here, set values employed in this embodiment are examples, and the above-described angle difference Δw may only be required to satisfy a relationship of Δwθ≥0 and may preferably satisfy a relationship of Δwθ>0.

FIG. 9 is a schematic view showing an arrow F1 which shows motion of the developer from the first feeding pole 105 on the first sleeve 33 to the second feeding pole 202 on the second sleeve 34, a state of magnetic flux lines formed by the first feeding pole 105, the delivering pole 106, the receiving pole 201, and the second feeding pole 202, and absolute values of magnetic flux density magnitudes of these magnetic poles in the normal direction. In this embodiment, the first feeding pole 105 and the receiving pole 201 are constituted by the S poles, and the delivering pole 106 and the second feeding pole 202 are constituted by the N poles. The magnetic poles to which the first feeding pole 105 which is the S pole is connected by magnetic flux lines are the delivering pole 106 and the second feeding pole 202 which are the N poles.

Here, as described above, a shape of the magnetic flux density of the receiving pole 201 is set so that of the half-value widths of the magnetic flux density peak value of the receiving pole 201 in the normal direction of the receiving pole 201, the upstream-side angle wθ21 is the downstream-side angle 2θ22 or less. Thus, of the half-value widths of the magnetic flux density of the receiving pole 201 close to the first feeding pole 105, the downstream-side angle wθ22 is widened, so that a magnetic field between the first feeding pole 105 and the delivering pole 106 is strengthened, and a magnetic field between the first feeding pole 105 and the second feeding pole 202 is weakened. Further, occurrence of movement of the developer between the first feeding pole 105 and the second feeding pole 202 as indicated by the arrow F2 is suppressed, so that occurrence of an abnormal image (image in vertical stripe shape) due to this can be suppressed.

Further, in order to weaken the magnetic field between the first feeding pole 105 and the second feeding pole 202, in comparison with simply increasing the magnetic flux density peak value of the receiving pole 201 in the normal direction of the receiving pole 201, by employing a constitution in which only the downstream-side angle of the half-value widths of the magnetic flux density of the receiving pole 201 close to the second feeding pole 202 is increased such that the angle difference of Δwθ>0, it becomes possible to suppress an increase in force for constraining the developer in the neighborhood of the closest position between the first sleeve 33 and the second sleeve 34, and thus deterioration of the developer can be suppressed.

Incidentally, of the second magnet 37, a part of the magnet forming the receiving pole 201 with respect to a circumferential direction is cut away, or a magnet different in magnetic force is embedded in the cut-away portion, so that as described above, a magnetic flux density distribution of the receiving pole 201 may be made asymmetric.

Figure 10:
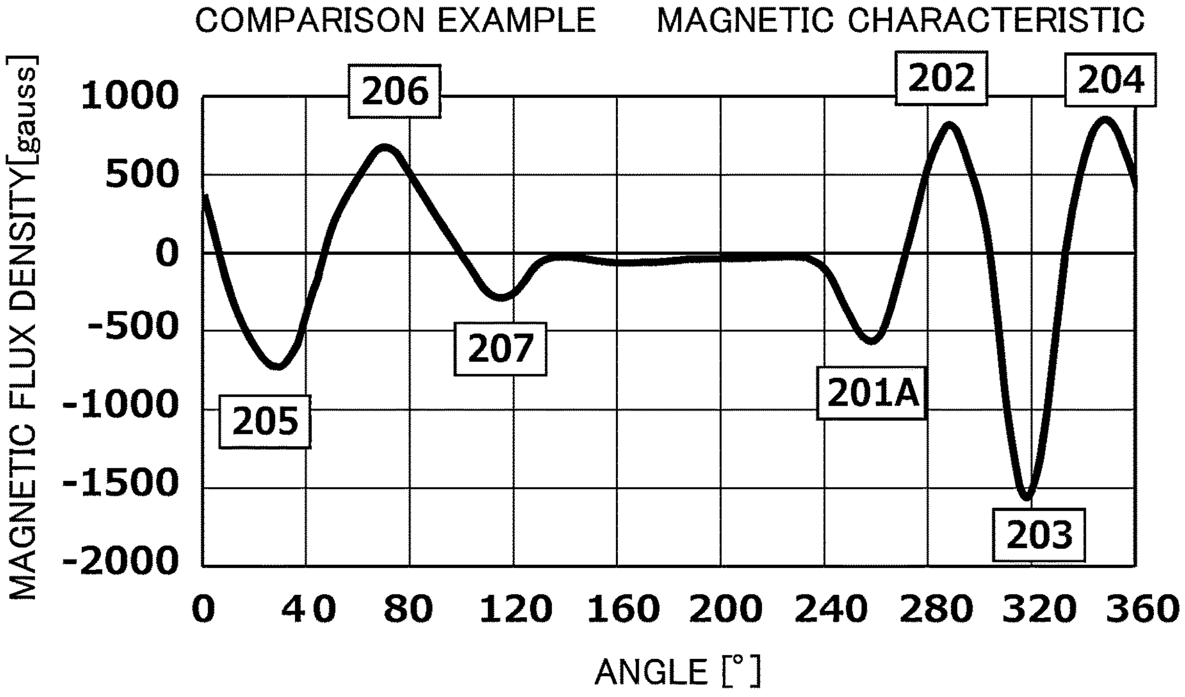
FIG. 10 is a graph showing a magnetic characteristic of a second developing roller in a comparison example.
Figure 11:
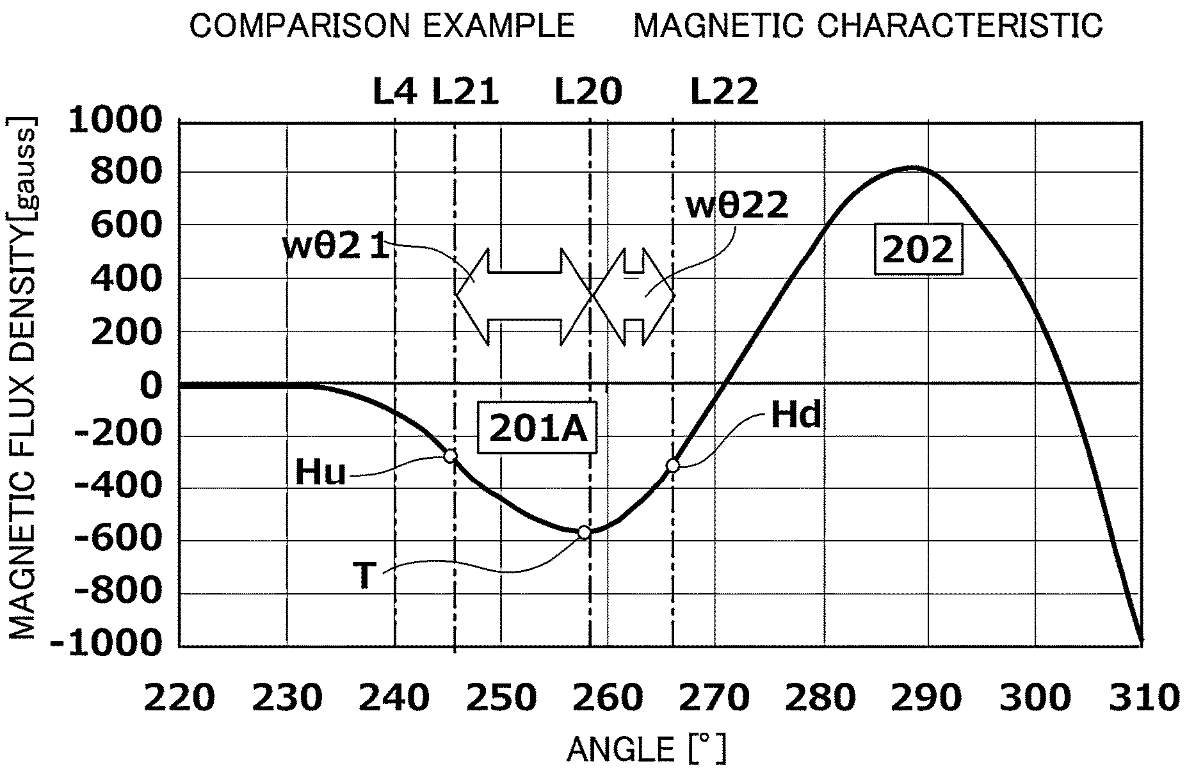
FIG. 11 is a graph showing a magnetic characteristic at a periphery of a receiving pole of the second developing roller in the comparison example.
Figure 12:
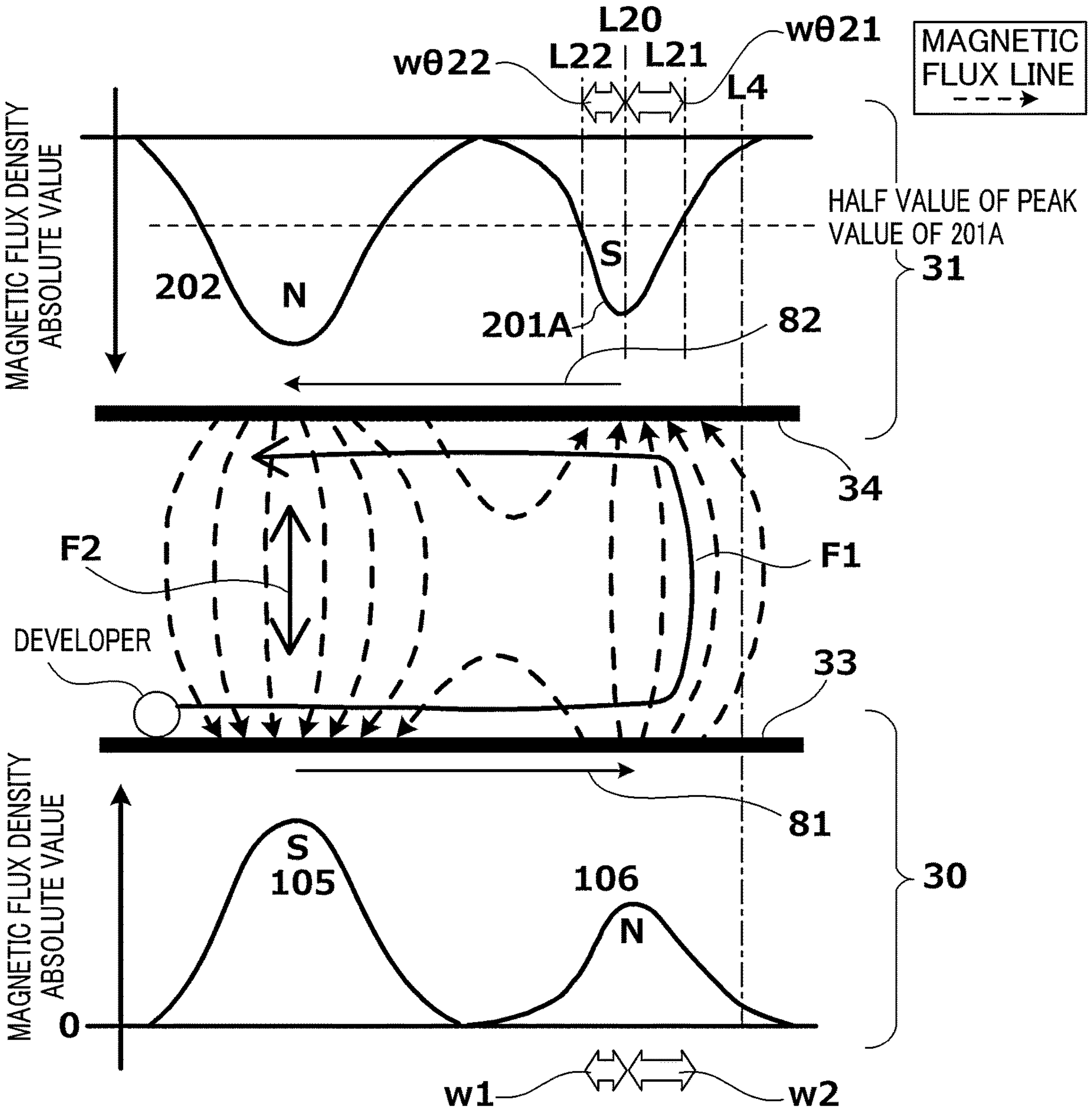
FIG. 12 is a schematic view showing for illustrating a state of a magnetic flux lines and magnetic flux density between the first developing roller and a second developing roller in the comparison example.

Next, a comparison example for comparison with this embodiment will be described using FIGS. 10 to 12. In the comparison example, a magnetic characteristic distribution of a receiving pole 201A is set so that the angle difference $\Delta w\theta$ satisfies $\Delta w\theta<0$. FIGS. 10 to 12 show states of magnetic fields formed by the first feeding pole 105, the delivering pole 106, the receiving pole 201A, and the second feeding pole 202 in such a comparison example.

A graph shown in FIG. 10 is a magnetic characteristic in the comparison example in which positions, with respect to an angle direction, of magnetic poles included in the second magnet 37 and magnitudes of the magnetic flux density disclosed in FIGS. 3 and 6 are shown, and is a graph similar to the graph of the above-described FIG. 7 except for the receiving pole 201A. FIG. 11 is a graph in which a position in the neighborhood of the receiving pole 201A and the second feeding pole 202 in FIG. 10 is enlarged, wherein the above-described rectilinear lines L4 and L20 to L22 on the second sleeve 34 are indicated by chain lines, and magnitudes of the angle wθ21 and the angle wθ22 are shown by double-pointed arrows. The receiving pole 201A of the second magnet 37 in the comparison example has the same magnetic flux density peak value as that of the above-described receiving pole 201 and as a constitution of $\Delta w\theta<0$ in which the upstream-side width of the half-value width is wide, and the angles wθ21 and wθ22 are set to wθ21=12 degrees and wθ22=9 degrees.

FIG. 12 is a schematic view showing the arrow F1 showing motion of the developer from the first feeding pole 105 on the first sleeve 33 to the second feeding pole 202 on the second sleeve 34, a state of magnetic flux lines formed by the first feeding pole 105, the delivering pole 106A, the receiving pole 201A, and the second feeding pole 202, and absolute values of the magnetic flux density magnitudes of these magnetic poles in the normal direction.

As described above, a shape of the magnetic flux density of the receiving pole 201A in the comparison example is set so that the angle wθ22 is smaller than the angle wθ21. Thus, in a constitution in which the downstream-side angle wθ22 of the half-value widths of the receiving pole 201A close to the second feeding pole 202 is narrow, the magnetic field between the second feeding pole 202 and the receiving pole 201A is weak, and the magnetic field between the first feeding pole 105 and the second feeding pole 202 cannot be sufficiently weakened. For this reason, movement of the developer between the first feeding pole 105 and the second feeding pole 202 occurs, so that the above-described fog image in the vertical stripe shape occurs. That is, non-uniformity occurs in coating state of the developer on the second sleeve 34, and an uneven image occurs on an output image. On the other hand, in this embodiment, the magnetic characteristic of the second magnet 37 is characteristics as shown in FIGS. 8 and 9, and therefore, occurrences of the unevenness in the output image and the image in the vertical stripe shape as in the comparison example can be suppressed.

[Experiment]

Next, an experiment in which an occurrence status of a stripe-shaped fog image (abnormal image) in the above-described constitution was checked will be described. In the example, the angle wθ21 and the angle wθ22 in the magnetic flux density distribution of the receiving pole 201 were changed, and images were outputted by image forming apparatuses in which delivering poles in various conditions are incorporated. Then, the occurrence status of the stripe-shaped fog image on the output image was checked.

In the experiment, the occurrence status of the stripe-shaped fog image on the output image was evaluated in the following manner.

Solid white images were formed on 10 A3-sized sheets, and the number of vertical stripes on the output image was measured.

In the case where there was no vertical stripe on the solid white images on the 10 A3-sized sheets, the solid white images were formed on 100 A3-sized sheets and then the vertical stripes were checked.

A result of this experiment is shown in tables 1 and 2.

TABLE 1

| wθ21(°), wθ22(°) | 12, 9 | 12, 10.5 | 12,12 | 12, 13.5 | 12, 15 | 12, 16.5 | 12, 18 | 12, 20 |
|---|---|---|---|---|---|---|---|---|
| Δwθ(wθ22 − wθ21)(°) | −3 | −1.5 | 0 | 1.5 | 3 | 4.5 | 6 | 8 |
| ABNORMAL IMAGE | X | X | ○ | ○ | ○ | ○ | ○ | ○ |

TABLE 2

| wθ21(°), wθ22(°) | (8, 5) | (8, 7.5) | (8, 8) | (8, 9.5) | (8, 11) | (8, 12.5) | (8, 14) | (8, 16) |
|---|---|---|---|---|---|---|---|---|
| Δwθ(wθ22 − wθ21)(°) | −3 | −1.5 | 0 | 1.5 | 3 | 4.5 | 5 | 8 |
| AI*1 | X | X | ○ | ○ | ○ | ○ | ○ | ○ |

*1 "AI" is the abnormal image.

Symbols in a row of the abnormal image in each of the tables 1 and 2 are results of evaluation of the occurrence status of the stripe-shaped fog image (abnormal image), and contents thereof are as follows.

x: On a single A3-sized sheet, 10 or more vertical) stripes were recognized.

Δ: On the single A3-sized sheet, about one vertical stripe was recognized.

○: On 10 A3-sized sheets, about one vertical stripe was recognized.

In the above evaluation, "o" shows a level such that the abnormal image does not substantially occur practically.

The constitutions of the first developing roller 30 and the second developing roller 31 are as shown in FIG. 6. The magnetic characteristic was such that the magnetic flux density peak value of the delivering pole 106 was fixed to 360 gauss and the magnetic flux density peak value of the receiving pole 201 is fixed to 562 gauss and that a shape of the magnetic flux density in the neighborhood of the receiving pole 201 relative to the rotation angle of the second sleeve 34 was changed. As a method of changing the magnetic flux density, it is possible to change the magnetic flux density by changing a condition when the receiving pole 201 carried on the second magnet 37 is magnetized or by cutting away a part of the magnet, or the like. Incidentally, the magnetic poles other than the receiving pole 201 are as shown in FIGS. 7 to 10.

The table 1 shows the result in the case where from a state of angle wθ21=12 degrees and angle wθ22=9 degrees in the comparison example, the angle wθ22 is increased. In the case where the angle difference Δwθ which is a difference of the angle wθ21 from the angle wθ22 is Δwθ<0, i.e., in the case where the angle wθ22 is smaller than the angle wθ21, it was found that the occurrence of the abnormal image cannot be suppressed. This is because as in the comparison example shown in FIG. 12, the angle wθ22 adjacent to the second feeding pole 202 is small, and therefore, the magnetic field between the first feeding pole 105 and the second feeding pole 202 cannot be sufficiently weakened by the magnetic field between the second feeding pole 202 and the receiving pole 201, and thus the developer is moved between the first feeding pole 105 and the second feeding pole 202. Further, this can also be said as a result that the magnetic field between the second feeding pole 202 and the receiving pole 201 cannot be strengthened even when the angle wθ21 which is not adjacent to the second feeding pole 202 is made large, and thus the magnetic field between the first feeding pole 105 and the second feeding pole 202 cannot be sufficiently weakened.

On the other hand, in the case of Δwθ≥0, i.e., in the case where the angle wθ22 is not less than the angle wθ21, it was found that the occurrence of the abnormal image can be suppressed. This is because as described with reference to FIG. 9, the angle wθ22 adjacent to the second feeding pole 202 is large, and therefore, the magnetic field between the second feeding pole 202 and the receiving pole 201 becomes strong, and thus the magnetic field between the first feeding pole 105 and the second feeding pole 202 can be weakened. As a result of this, movement of the developer in the arrow F2 direction between the first feeding pole 105 and the second feeding pole 202 can be suppressed, so that the occurrence of the abnormal image can be suppressed.

The table 2 shows the result in the case where a condition of the angle wθ22 is changed in a constitution in which the half-value width of the receiving pole 201 is narrower than that in the table 1. Similarly as the result of the table 1, it was found that the occurrence of the abnormal image can be suppressed by satisfying Δwθ>0. However, in the condition of the table 2, in the angle difference Δwθ=0, compared with the result of the table 1, the occurrence of the abnormal image cannot be sufficiently suppressed. This is because the half-value width of the receiving pole 201 when the angle difference Δw in the table 1 is Δwθ=0 is 24 degrees, whereas the half-value width of the receiving pole 201 when the angle difference Δw in the table 2 is Δw=0 is 16 degrees narrower than 24 degrees. When the half-value width is narrow, due to assembling tolerances of the first magnet 36 and the second magnet 37, some change in magnetic pole position by the influence of variation in magnetization, and the like, the magnetic field between the receiving pole 201 and the second feeding pole 202 is changed in a weakening direction in some instances. In this case, an effect of weakening the magnetic field between the first feeding pole 105 and the second feeding pole 202 and suppressing movement of developer between the first feeding pole 105 and the second feeding pole 202 becomes small (weak). Accordingly, in the case where the half-value width is narrow, it is preferable that the angle difference Δwθ>0 is satisfied.

As described above, according to this embodiment, occurrence of an image defect can be suppressed. That is, in the developing device 1Y of this embodiment, the developer fed from the first feeding pole 105 to the delivering pole 106 on the first sleeve 33 and is delivered to the second sleeve 34 on the basis of the magnetic field between the delivering pole 106 and the receiving pole 201, and then is conveyed on the second sleeve 34 from the receiving pole 201 to the second feeding pole 202. In such a constitution, the developer is moved by the magnetic force along the magnetic field from the first feeding pole 105 to the second feeding pole 202 in some cases. On the other hand, in this embodiment, the receiving pole 201 satisfied Δwθ≥0 as described above, and therefore, the magnetic field between the second feeding pole 202 and the receiving pole 201 weakens the magnetic field between the first feeding pole 105 and the second feeding pole 202, so that movement of the developer between the first feeding pole 105 and the second feeding pole 202 can be suppressed. For this reason, the occurrence of the above-described stripe-shaped fog image can be suppressed.

Particularly, even in an image forming apparatus in which an image forming speed (process speed) is high, the movement of the developer between the first feeding pole 105 and the second feeding pole 202 can be suppressed, so that the occurrence of the above-described stripe-shaped fog image can be suppressed. Further, the developer is stably circulated from the first developing roller 30 and then by the second developing roller 31, the peeling roller 32, and the developer circulating portion 46, so that it is possible to provide the developing device 1Y and the image forming apparatus in which stable image output is carried out.

Incidentally, set values employed in this embodiment are examples, and as described above, the angle difference Δwθ may desirably satisfy Δw0≥0°, preferably Δwθ≥3°, more preferably Δwθ≥6°. This is because magnetic flux lines become easier to extend between the receiving pole 201 and the second feeding pole 202 when the angle difference Δwθ becomes larger, and thus an effect such that the magnetic field acting between the receiving pole 201 and the second feeding pole 202 weakens the magnetic field acting between the first feeding pole 105 and the second feeding pole 202.

Second Embodiment

A second embodiment will be described using FIGS. 13 to 15. This embodiment is different from the first embodiment in constitution of a receiving pole 201B of a second magnet 37 of a second developing roller 31. Other constitutions and actions are similar to those in the first embodiment, and therefore, as regards similar constitutions, description and illustration are omitted or briefly made by adding the same reference numerals or symbols, and in the following, a difference from the first embodiment will be principally described.

In the case of the above-described first embodiment, as shown in FIG. 8, a relationship between an upstream-side half-value width and a downstream-side half-value width, with respect to the rotational direction of the second sleeve 34, of the magnetic flux density of the receiving pole 201 of the second magnet 37 included in the second developing roller 31 satisfies $\Delta w\theta \geq 0$. The angle $w\theta 22$ close to the second feeding pole 202 is large, and therefore, by the magnetic field between the second feeding pole 202 and the receiving pole 201, the magnetic field between the first feeding pole 105 and the second feeding pole 202 can be weakened.

Figure 13:
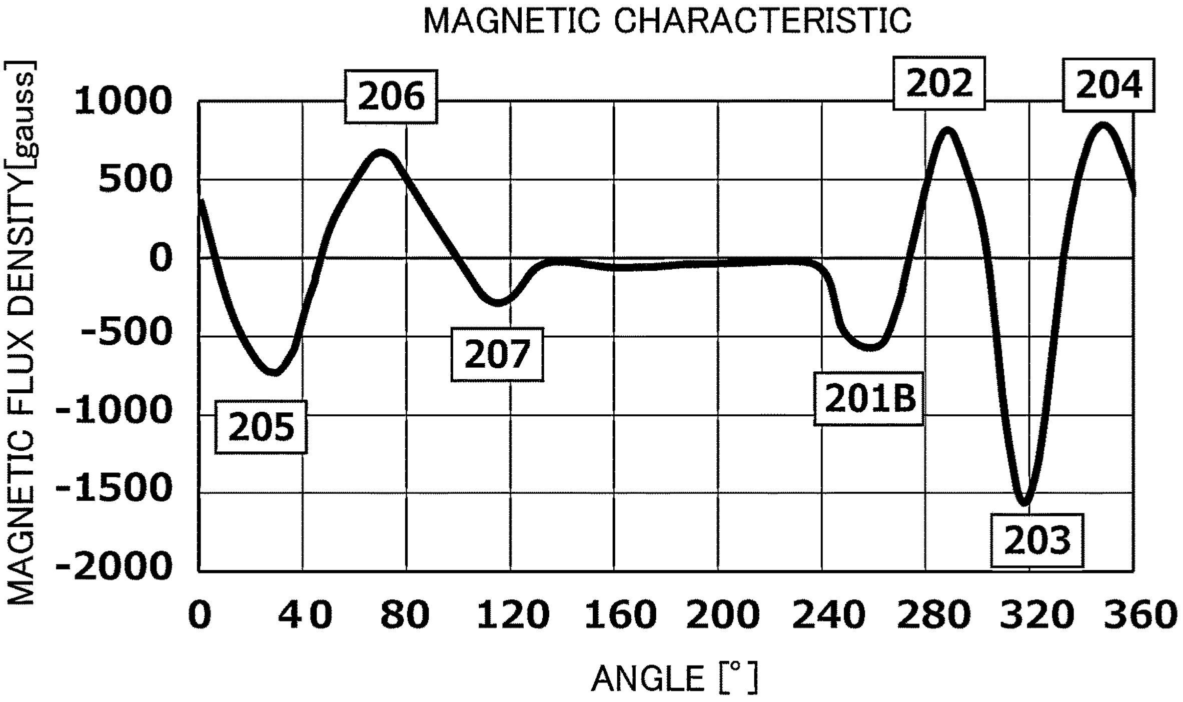
FIG. 13 is a graph showing a magnetic characteristic of a second developing roller in a second embodiment.
Figure 14:
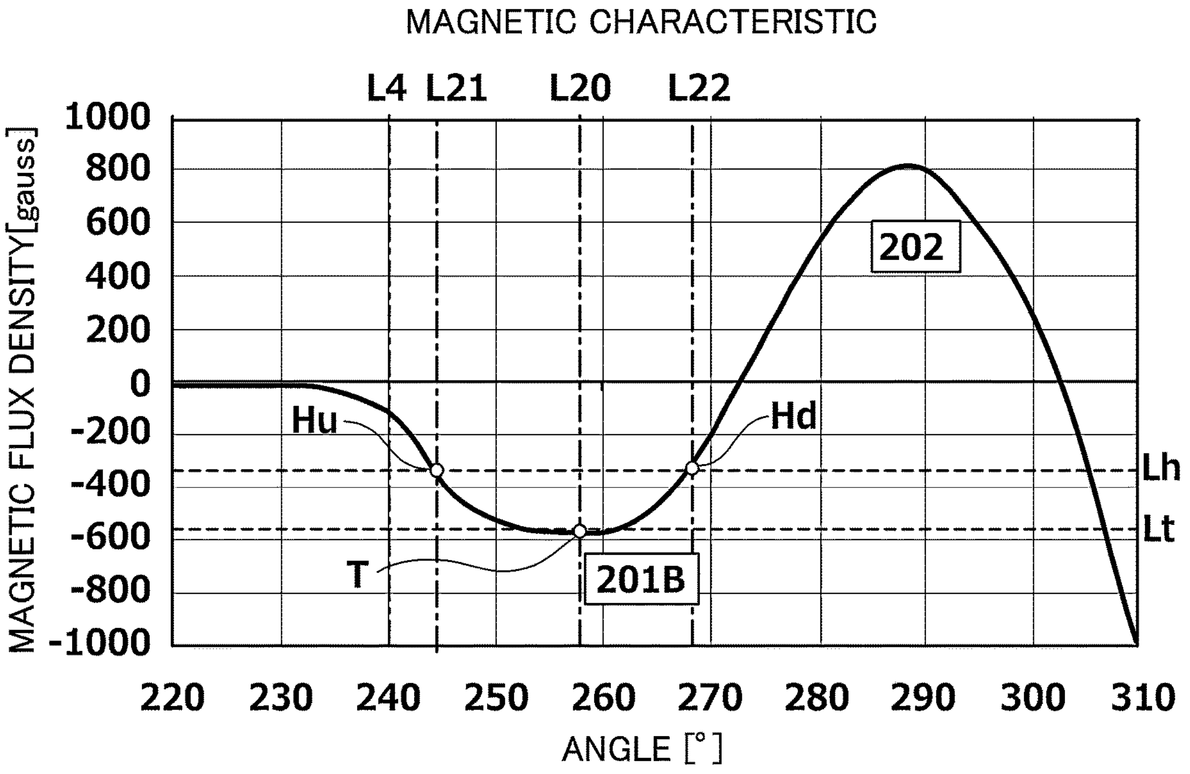
FIG. 14 is a schematic view showing a magnetic characteristic at a periphery of a delivering pole of the second developing roller in the second embodiment.

On the other hand, in this embodiment, as shown in FIGS. 13 and 14, in the position of the receiving pole 201 of the second magnet 37 employed in the first embodiment, the receiving pole 201B is provided. A magnetic flux density peak value of this receiving pole 201B is the same as the magnetic flux density peak value of the receiving pole 201. On the other hand, a shape of the magnetic flux density peak value is changed to a flat shape.

This flat shape will be described. FIG. 15 shows a result of measurement of the magnetic flux density of the receiving pole 201B in the normal direction of the receiving pole 201B, in which the rotational direction of the second sleeve 34 is taken as the abscissa. That is, FIG. 15 is a graph showing a normal component of the magnetic flux density of the receiving pole 201B on the surface of the second sleeve 34, in which the ordinate represents the magnetic flux density, and the abscissa represents an angle of the second sleeve 34 with respect to the rotational direction of the second sleeve 34. Here, in the following manner, values Lt and Lh, and rectilinear lines HLt, HLh, VL21, and VL22 are defined:

- Lt: peak value (maximum value of normal component) of magnetic flux density of receiving pole 201B on surface of the second sleeve 34,
- Lh: half value of peak value Lt of magnetic flux density of receiving pole 201B,
- HLt: rectilinear line parallel to abscissa passing through position of value Lt (broken line),
- HLh: rectilinear line parallel to abscissa passing through position of value Lh (broken line),
- VL21: rectilinear line parallel to ordinate passing through point Hu (chain line), and
- VL22: rectilinear line parallel to ordinate passing through point Hd (chain line).

Incidentally, Hu is similarly as the first embodiment, of half-value positions of the maximum value of the normal component of the magnetic flux density of the receiving pole 201B, an upstream-side position with respect to the rotational direction of the second sleeve 34. Further, Hd is, similarly as in the first embodiment, of the half-value positions of the normal component of the magnetic flux density of the receiving pole 201B, a downstream-side position with respect to the rotational direction of the second sleeve 34.

Figure 15:
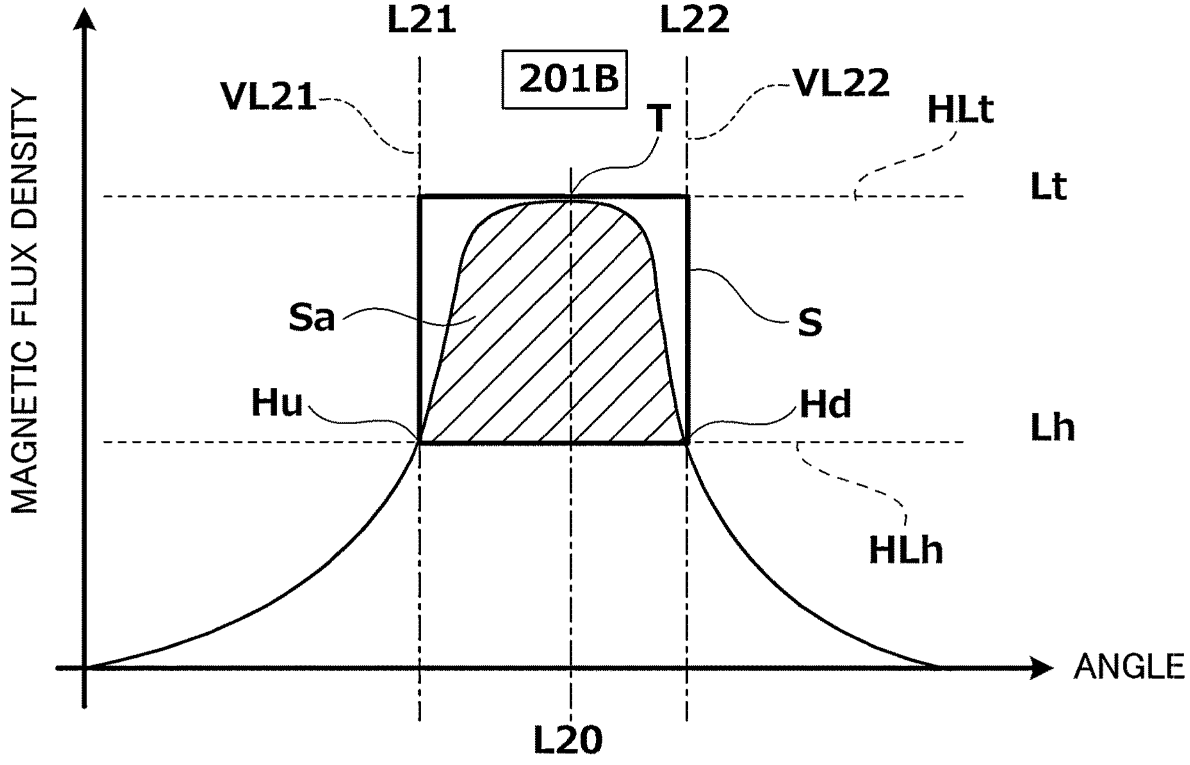
FIG. 15 is a graph showing the magnetic characteristic of the receiving pole of FIG. 14 in an enlarged manner.

Further, a rectangular area enclosed by the rectilinear lines VL21, VL22, HLt, and HLh is an area S, and in the graph of FIG. 15, an area (hatched portion) obtained by integrating the normal component of the magnetic flux density of the receiving pole 201B from the rectilinear line VL21 to the rectilinear line VL22 in terms of an angle with respect to the rotational direction of the second sleeve 34 is an area Sa.

As described above, in order to suppress the movement of the developer by weakening the magnetic field from the first feeding pole 105 to the second feeding pole 202, it is effective that the magnetic field between the second feeding pole 202 and the receiving pole 201B is strengthened. For this reason, it would be considered that the magnetic flux density peak value of the receiving pole 201B is made large, and by this, the magnetic field between the receiving pole 201B and the second feeding pole 202 can be strengthened. However, a magnetic field contributing to the delivery of the developer from the first sleeve 33 to the second sleeve 34 is also largely changed, and therefore, there is a possibility that the strengthened magnetic field leads to developer movement with rotation of the first sleeve 33 and deterioration of the developer.

Therefore, in this embodiment, the magnetic flux density peak value of the receiving pole 201B is not made large, but the area Sa which is an integrated value of values not less than the half value of the magnetic flux density peak value of the receiving pole 201B is made large. Specifically, a portion of the receiving pole 201B in the neighborhood of the magnetic flux density peak value position is formed in the flat shape so that the area ratio Sa/S of the area Sa to the area S becomes 75% or more ($Sa/S \geq 75\%$). As a result, the magnetic field between the second feeding pole 202 and the receiving pole 201B is strengthened, and thus the magnetic field between the first feeding pole 105 and the second feeding pole 202 can be weakened, so that the movement of the developer between the first feeding pole 105 and the second feeding pole 202 can be suppressed.

Incidentally, the constitution in which the shape of the receiving pole 201B in the neighborhood of the magnetic flux density peak value is flat is not limited to one peak, but may also be a plurality of peaks, and may only be required to be constituted so as to satisfy the area ratio $Sa/S > 75\%$. Further, a flat-shaped magnetic flux density distribution as in the receiving pole 201B may be formed by cutting away a part a magnet with respect to a circumferential direction, of the second magnet 37, forming the receiving pole 201B or by embedding a magnet different in magnetic force in the cut-away portion.

Further, the receiving pole 201B in this embodiment employs the flat shape of the magnetic flux density in the normal direction, extending toward a downstream side and an upstream side of the position of the magnetic flux density peak value in the normal direction of the receiving pole 201 in the first embodiment. For this reason, the magnetic field between the delivering pole 106 and the receiving pole 201B is formed widely, so that the influences on a change in magnetic field of the delivering pole 106 and the receiving pole 201B due to variation in magnetization and assembling tolerance of the first magnet 36 and the second magnet 37 becomes small. That is, in this embodiment, compared with the first embodiment, movement of the developer between the first feeding pole 105 and the second feeding pole 202 can be suppressed while widening a delivery latitude of the developer from the first sleeve 33 to the second sleeve 34 relative to a variation in magnetic pole arrangement of the first magnet 36 and the second magnet 37.

[Experiment]

Next, an experiment in which an occurrence status of a stripe-shaped fog image (abnormal image) in the above-described constitution was checked will be described. In the example, the area S and the area Sa were changed by adjusting the magnetic flux density of the receiving pole 201B, and images were outputted by image forming apparatuses in which delivering poles in various conditions are incorporated. Then, the occurrence status of the stripe-shaped fog image on the output image was checked.

Other conditions and evaluation of the experiment are the same as those of the experiment described in the first embodiment. A result of this experiment is shown in a table 3.

TABLE 3

| Sa*[1] S*[2] | 3297 | 5495 | 3831 | 5893 | 4023 | 5893 | 3845 | 5495 | 4119 | 5492 | 5459 | 7001 | 6467 | 8088 |
|---|---|---|---|---|---|---|---|---|---|---|---|---|---|---|
| Sa/S | 60% | | 65% | | 68% | | 70% | | 75% | | 78% | | 80% | |
| AI*[3] | X | | X | | X | | X | | ○ | | ○ | | ○ | |

*[1]"Sa" shows the area Sa [rad · gauss].
*[2]"S" shows the area Sa [rad · gauss].
*[3]"AI" shows the abnormal image.

Constitutions of the first developing roller 30 and the second developing roller 31 in the experiment are as shown in FIG. 6. A magnetic characteristic is, as shown in FIG. 15, such that a magnetic flux density peak value of the receiving pole 201B was fixed to 562 gauss and that a shape of the magnetic flux density in the neighborhood of the receiving pole 201B was changed stepwise from 60% to 80% in terms of the area ratio Sa/S. The magnetic poles other than the receiving pole 201B are as shown in FIG. 13.

As is apparent from the table 3, when the area ratio Sa/S is 75% or more, occurrence of the abnormal image was able to be suppressed. This is an effect such that the neighborhood of the magnetic flux density peak value of the receiving pole 201B approaches the first feeding pole 105, and thus the magnetic field between the second feeding pole 202 and the receiving pole 201B is strengthened and the magnetic field between the first feeding pole 105 and the second feeding pole 202 is weakened. On the other hand, when the area ratio Sa/S is less than 75%, magnetic flux lines between the receiving pole 201B and the second feeding pole 202 do not readily extend, and therefore, an effect of weakening the magnetic field between the first feeding pole 105 and the second feeding pole 202 was low, so that the developer was moved between the first feeding pole 105 and the second feeding pole 202, with the result that the it was incapable of sufficiently suppressing the abnormal image.

As described above, according to this embodiment, occurrence of an image defect can be suppressed. That is, in the developing device 1Y of this embodiment, the developer fed from the first feeding pole 105 to the delivering pole 106 on the first sleeve 33 and is delivered to the second sleeve 34 on the basis of the magnetic field from the delivering pole 106 to the receiving pole 201B, and then is conveyed on the second sleeve 34 from the receiving pole 201B to the second feeding pole 202. In such a constitution, the developer is moved by the magnetic force along the magnetic field from the first feeding pole 105 to the second feeding pole 202 in some cases. On the other hand, in this embodiment, the neighborhood of the magnetic flux density peak value is constituted to have a flat shape so that the receiving pole 201B satisfies the area ratio Sa/S≥75% as described above, so that the magnetic field between the second feeding pole 202 and the receiving pole 201B weakens the magnetic field between the first feeding pole 105 and the second feeding pole 202, and therefore movement of the developer between the first feeding pole 105 and the second feeding pole 202 can be suppressed. For this reason, the occurrence of the above-described stripe-shaped fog image can be suppressed.

Incidentally, set values employed in this embodiment are examples, and as described above, the magnetic flux density distribution of the receiving pole 201B may desirably satisfy the area ratio Sa/S≥75%, preferably Sa/S≥78%, more preferably Sa/S≥80%. This is because magnetic flux lines become easier to extend between the receiving pole 201B and the second feeding pole 202 when the area ratio becomes larger, and thus an effect such that the magnetic field acting between the receiving pole 201B and the second feeding pole 202 weakens the magnetic field acting between the first feeding pole 105 and the second feeding pole 202.

Third Embodiment

A third embodiment will be described using FIGS. 16 and 17. This embodiment is different from the first embodiment in constitution of a receiving pole 201C of a second magnet 37 of a second developing roller 31. Other constitutions and actions are similar to those in the first embodiment, and therefore, as regards similar constitutions, description and illustration are omitted or briefly made by adding the same reference numerals or symbols, and in the following, a difference from the first embodiment will be principally described.

In the case of the above-described second embodiment, as shown in FIG. 15, the integrated value Sa of values not less than the half value of the magnetic flux density peak value of the receiving pole 201B of the second magnet 37 included in the second developing roller 31 is increased so that the area ratio Sa/S becomes 75% or more, and thus the magnetic field between the second feeding pole 202 and the receiving pole 201B was strengthened, so that the magnetic field between the first feeding pole 105 and the second feeding pole 202 was weakened.

Figure 16:
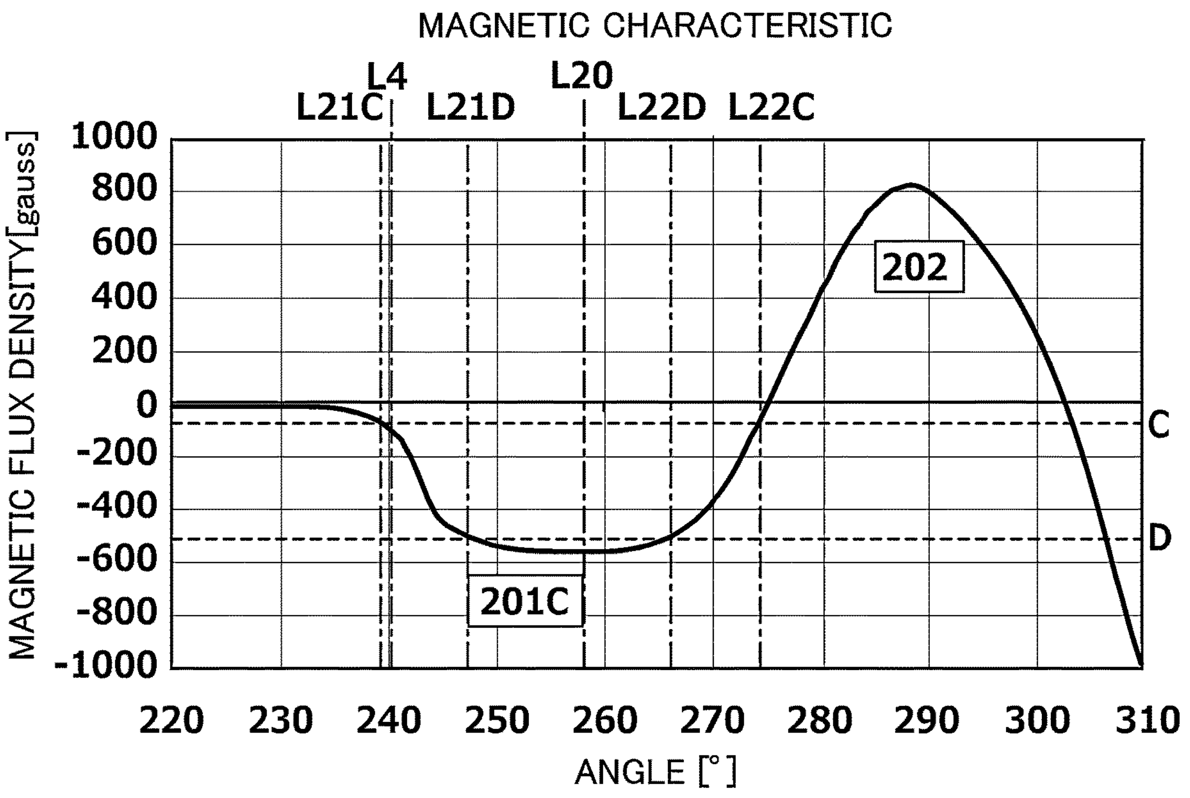
FIG. 16 is a graph showing a magnetic characteristic at a periphery of a receiving pole of a second developing roller in a third embodiment.
Figure 17:
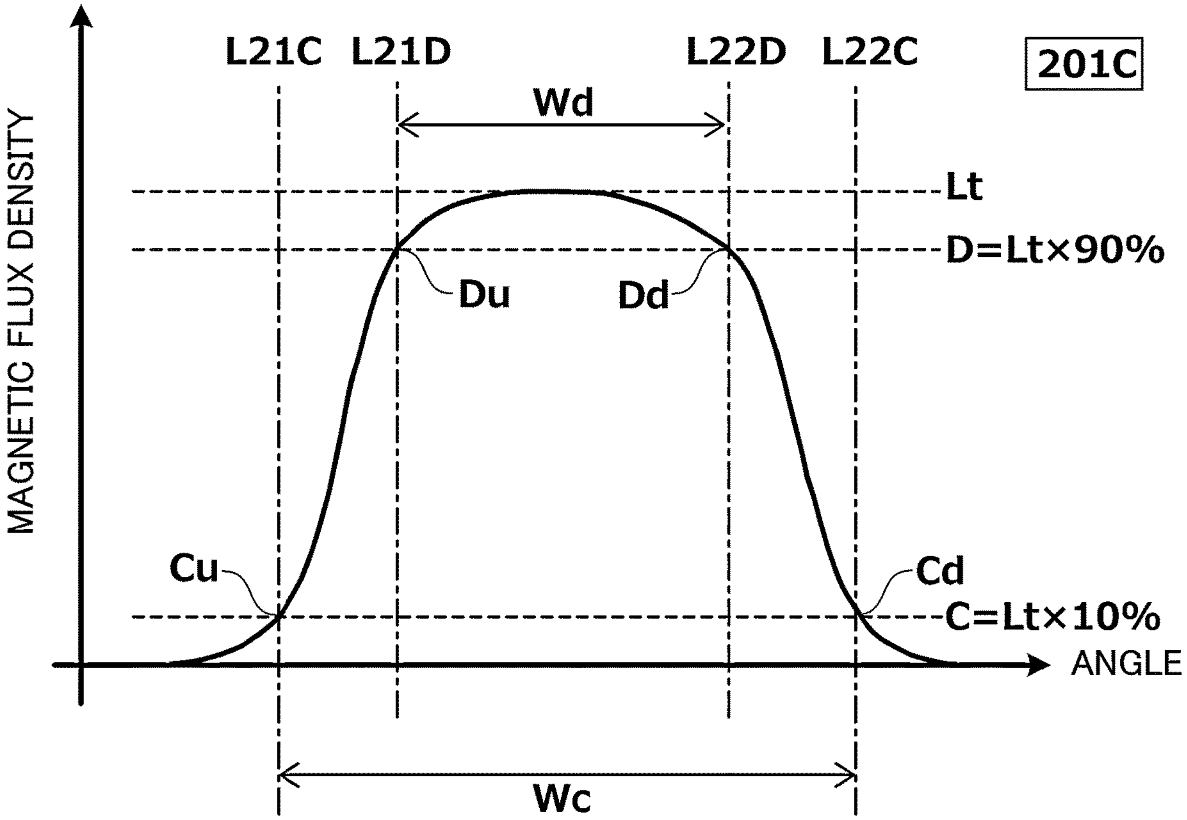
FIG. 17 is a graph showing the magnetic characteristic of the receiving pole of FIG. 16.

On the other hand, in this embodiment, as shown in FIG. 16, in the position of the receiving pole 201 of the second magnet 37 employed in the first embodiment, the receiving pole 201C is provided. A magnetic flux density peak value of this receiving pole 201C is the same as the magnetic flux density peak value of the receiving pole 201. On the other hand, a shape of the magnetic flux density peak value is a shape close to a flat shape.

This flat shape will be described. FIG. 17 shows a result of measurement of the magnetic flux density of the receiving pole 201C in the normal direction of the receiving pole 201, in which the rotational direction of the second sleeve 34 is taken as the abscissa. Here, as described in the following, values C and D, points Cd, Cu, Dd, and Du, rectilinear lines L21C, L22C, L21D, and L22D, and angles Wc and Wd are defined. Incidentally, a value Lt is a magnetic flux density peak value of the receiving pole 201C similarly as in the second embodiment.

C: value of 10% of value Lt,

D: value of 90% of value Lt,

Cu: upstream-side position, with respect to rotational direction of second sleeve 34, of positions where normal component of magnetic flux density of receiving pole 201C becomes value C, Cd: upstream-side position, with respect to rotational direction of second sleeve 34, of positions where normal component of magnetic flux density of receiving pole 201C becomes value C, Du: upstream-side position, with respect to rotational direction of second sleeve 34, of positions where normal component of magnetic flux density of receiving pole 201C becomes value D, Dd: downstream-side position, with respect to rotational direction of second sleeve 34, of positions where normal component of magnetic flux density of receiving pole 201C becomes value D, L21C: rectilinear line connecting rotation center R2 of second sleeve 34 and point Cu (chain line), L22C: rectilinear line connecting rotation center R2 and point Cd (chain line), L21D: rectilinear line connecting rotation center R2 and point Du (chain line), L22D: rectilinear line connecting rotation center R2 and point Dd (chain line), Wc: angle formed by rectilinear line L21C and rectilinear line L22C, and Wd: angle formed by rectilinear line L21D and rectilinear line L22D.

As described above, in order to suppress the movement of the developer between the first feeding pole 105 and the second feeding pole 202 by weakening the magnetic field from the first feeding pole 105 to the second feeding pole 202, it is effective that the magnetic field between the second feeding pole 202 and the receiving pole 201C is strengthened. For this reason, it would be considered that the magnetic flux density peak value of the receiving pole 201C is made large, and by this, the magnetic field between the receiving pole 201C and the second feeding pole 202 can be strengthened. However, a magnetic field contributing to the delivery of the developer from the first sleeve 33 to the second sleeve 34 is also largely changed, and therefore, there is a possibility that the strengthened magnetic field leads to developer movement with rotation of the first sleeve 33 and deterioration of the developer.

Therefore, in this embodiment, the magnetic flux density peak value of the receiving pole 201C is not made large, but feeding pole 105 and the second feeding pole 202 can be weakened, so that the movement of the developer between the first feeding pole 105 and the second feeding pole 202 can be suppressed.

Incidentally, the constitution in which the shape of the receiving pole 201C in the neighborhood of the magnetic flux density peak value is flat is not limited to one peak, but may also be a plurality of peaks, and may only be required to be constituted so as to satisfy the angle ratio Wd/Wc>40%. Further, a flat-shaped magnetic flux density distribution as in the receiving pole 201C may be formed by cutting away a part a magnet with respect to a circumferential direction, of the second magnet 37, forming the receiving pole 201C or by embedding a magnet different in magnetic force in the cut-away portion.

Further, the receiving pole 201C in this embodiment employs the flat shape of the magnetic flux density in the normal direction, extending toward a downstream side and an upstream side of the position of the magnetic flux density peak value in the normal direction of the receiving pole 201 in the first embodiment. For this reason, the magnetic field between the receiving pole 201C and the receiving pole 201 is formed widely, so that the influences on a change in magnetic field of the delivering pole 106 and the receiving pole 201C due to variation in magnetization and assembling tolerance of the first magnet 36 and the second magnet 37 becomes small. That is, in this embodiment, compared with the first embodiment, movement of the developer between the first feeding pole 105 and the second feeding pole 202 can be suppressed while widening a delivery latitude of the developer from the first sleeve 33 to the second sleeve 34 relative to a variation in magnetic pole arrangement of the first magnet 36 and the second magnet 37.

[Experiment]

Next, an experiment in which an occurrence status of a stripe-shaped fog image (abnormal image) in the above-described constitution was checked will be described. In the example, the angle Wc and the angle Wd were changed by adjusting the magnetic flux density of the receiving pole 201C, and images were outputted by image forming apparatuses in which delivering poles in various conditions are incorporated. Then, the occurrence status of the stripe-shaped fog image on the output image was checked.

Other conditions and evaluation of the experiment are the same as those of the experiment described in the first embodiment. A result of this experiment is shown in a table 4.

TABLE 4

| Wd(°), Wc(°) | (7.1, 32.4) | (8.3, 32.4) | (12, 32.4) | (13, 32.4) | (14.6, 32.4) | (18.3, 36.2) |
|---|---|---|---|---|---|---|
| Wd/Wc | 22% | 26% | 37% | 40% | 45% | 51% |
| AI*1 | X | X | X | ○ | ○ | ○ |

*1"AI" is the abnormal image.

the angle Wd which is a 90%-value width of the magnetic flux density peak value of the delivering pole 106C is made large. Specifically, a portion of the receiving pole 201C in the neighborhood of the magnetic flux density peak value position is formed in the flat shape so that the angle ratio Wd/Wc of the angle Wd to the angle Wc which is a 10%-value width of the magnetic flux density peak value of the receiving pole 201C becomes 40% or more (Wd/Wc≥40%). As a result, the magnetic field between the second feeding pole 202 and the receiving pole 201C is strengthened, and thus the magnetic field between the first Constitutions of the first developing roller 30 and the second developing roller 31 in the experiment are as shown in FIG. 6. A magnetic characteristic is, as shown in FIG. 16, such that a magnetic flux density peak value of the receiving pole 201C was fixed to 562 gauss and that a shape of the magnetic flux density of the receiving pole 201C was changed stepwise from 22% to 51% in terms of the angle ratio Wd/Wc. The magnetic poles other than the receiving pole 201C are as shown in FIG. 13.

As is apparent from the table 4, when the angle ratio Wd/Wc is 40% or more, occurrence of the abnormal image was able to be suppressed. This is an effect such that the neighborhood of the magnetic flux density peak value of the receiving pole 201C approaches the second feeding pole 202, and thus the magnetic field between the second feeding pole 202 and the receiving pole 201C is strengthened and the magnetic field between the first feeding pole 105 and the second feeding pole 202 is weakened. On the other hand, when the angle ratio Wd/Wc is less than 40%, an effect of weakening the magnetic field between the first feeding pole 105 and the second feeding pole 202 by the magnetic fluxes of the receiving pole 201C was low, so that the developer was moved between the first feeding pole 105 and the second feeding pole 202, with the result that it was incapable of sufficiently suppressing the abnormal image.

As described above, according to this embodiment, occurrence of an image defect can be suppressed. That is, in the developing device 1Y of this embodiment, the developer fed from the first feeding pole 105 to the delivering pole 106 on the first sleeve 33 and is delivered to the second sleeve 34 on the basis of the magnetic field between the delivering pole 106 and the receiving pole 201C, and then is conveyed on the second sleeve 34 from the receiving pole 201C to the second feeding pole 202. In such a constitution, the developer is moved by the magnetic force along the magnetic field between the first feeding pole 105 and the second feeding pole 202 in some cases. On the other hand, in this embodiment, the neighborhood of the magnetic flux density peak value is constituted to have a flat shape so that the receiving pole 201C satisfies the angle ratio Wd/Wc≥40% as described above, so that the magnetic field between the second feeding pole 202 and the receiving pole 201C weakens the magnetic field between the first feeding pole 105 and the second feeding pole 202, and therefore movement of the developer between the first feeding pole 105 and the second feeding pole 202 can be suppressed. For this reason, the occurrence of the above-described stripe-shaped fog image can be suppressed.

Incidentally, set values employed in this embodiment are examples, and as described above, the magnetic flux density distribution of the receiving pole 201C may desirably satisfy the angle ratio Wd/Wc≥40%, preferably Wd/Wc≥43%, more preferably Wd/Wc≥45%. This is because magnetic flux lines become easier to extend between the receiving pole 201C and the second feeding pole 202 when the angle ratio becomes larger, and thus an effect such that the magnetic field acting between the receiving pole 20C and the second feeding pole 202 weakens the magnetic field acting between the first feeding pole 105 and the second feeding pole 202.

Fourth Embodiment

A fourth embodiment will be described using FIG. 18. This embodiment is different from the first embodiment in constitution of a receiving pole 201D of a second magnet 37 of a second developing roller 31. Other constitutions and actions are similar to those in the first embodiment, and therefore, as regards similar constitutions, description and illustration are omitted or briefly made by adding the same reference numerals or symbols, and in the following, a difference from the first embodiment will be principally described.

Figure 18:
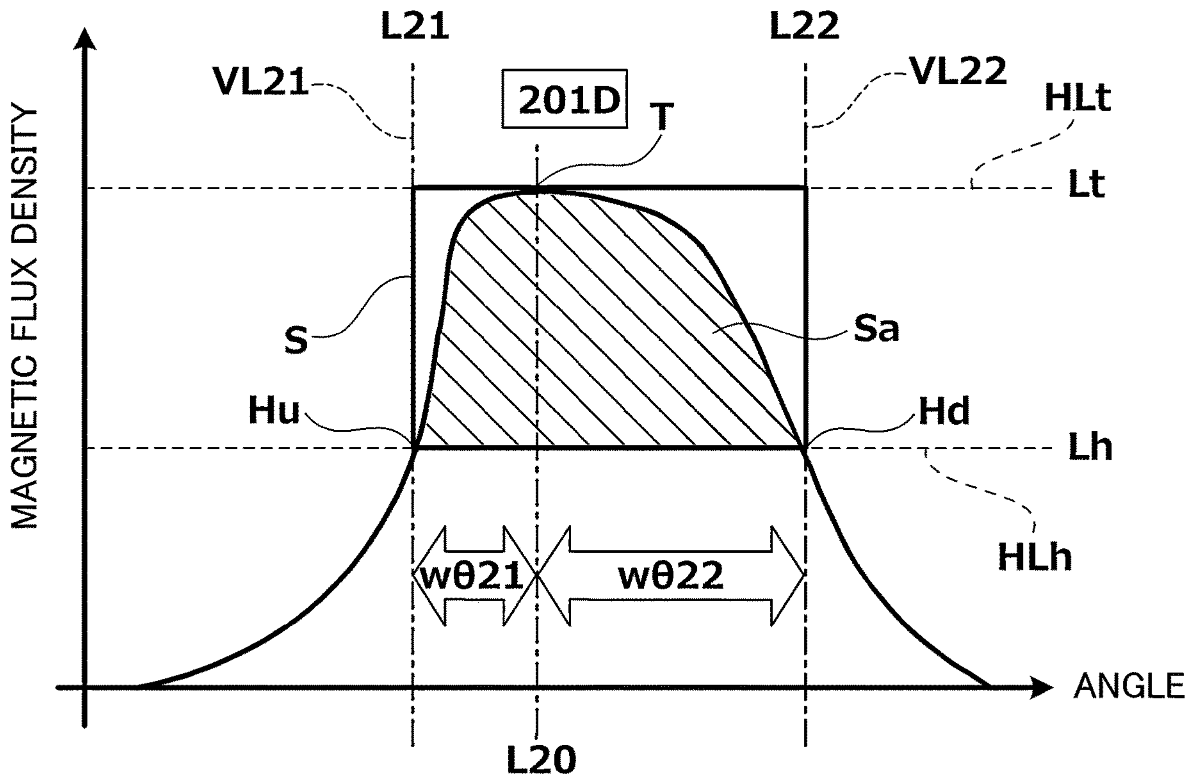
FIG. 18 is a graph showing a magnetic characteristic at a periphery of a receiving pole of a second developing roller in a fourth embodiment in an enlarged manner.

In this embodiment, as shown in FIG. 18, in the position of the receiving pole 201 of the second magnet 37 employed in the first embodiment, the receiving pole 201D is provided. A magnetic flux density peak value of this receiving pole 201D is the same as the magnetic flux density peak value of the receiving pole 201. On the other hand, this embodiment is characterized that a shape of the magnetic flux density peak value of the receiving pole 201D is a shape close to a flat shape, and that of half values, a downstream-side width is wider than an upstream-side width. Specifically, a constitution satisfying the angle difference Δwθ≥0 described in the first embodiment and the area ratio Sa/S≥70% described in the second embodiment. Incidentally, in the case of this embodiment, different from the second embodiment, Δwθ2≥0 is satisfied, and therefore, as regards the area ratio Sa/S, Sa/S≥65% may only be required to be satisfied. However, it is preferable that Sa/Sa≥70% is satisfied.

In such a case of this embodiment, the magnetic flux density of the receiving pole 201D on a side downstream of the magnetic flux density peak value of the receiving pole 201D in a range close to the second feeding pole 202 is larger than the magnet flux densities of the delivering poles in the same range in the first embodiment and the second embodiment. For that reason, compared with the first and second embodiments, the magnetic field between the second feeding pole 202 and the receiving pole 201D is stronger and an effect of weakening the magnetic field between the first feeding pole 105 and the second feeding pole 202 is higher. For this reason, an effect of suppressing the movement of the developer between the first feeding pole 105 and the second feeding pole 202 becomes high.

[Experiment]

Next, an experiment in which an occurrence status of a stripe-shaped fog image (abnormal image) in the above-described constitution was checked will be described. In the example, the angle difference Δwθ and the area ratio Sa/S were changed by adjusting the magnetic flux density of the receiving pole 201D, and images were outputted by image forming apparatuses in which delivering poles in various conditions are incorporated. Then, the occurrence status of the stripe-shaped fog image on the output image was checked.

Other conditions and evaluation of the experiment are the same as those of the experiment described in the first embodiment. A result of this experiment is shown in a table 5.

TABLE 5

| Δwθ[°] | −3 | −1 | 0 | 2 | 3 |
|---|---|---|---|---|---|
| Sa/S | 61% | 65% | 70% | 72% | 75% |
| AI*[1] | X | Δ | ○ | ○ | ○ |

*[1]"AI" is the abnormal image.

Constitutions of the first developing roller 30 and the second developing roller 31 in the experiment are as shown in FIG. 6. A magnetic characteristic is such that a magnetic flux density peak value of the receiving pole 201D was fixed to 562 gauss and that the angle difference Δwθ was changed from −3(°) to 3(°), and at the same time, a shape of the magnetic flux density of the receiving pole 201D was changed stepwise from 61% to 75% in terms of the area ratio Sa/S. The magnetic poles other than the receiving pole 201D are as shown in FIG. 7.

As is apparent from the table 5, when the angle difference Δwθ is 0(°) or more, and the area ratio Sa/S is 70% or more, occurrence of the abnormal image was able to be suppressed. This is an effect such that the neighborhood of the magnetic flux density peak value of the receiving pole 201D approaches the second feeding pole 202, and thus the magnetic field between the first feeding pole 105 and the receiving pole 201D is strengthened and the magnetic field between the first feeding pole 105 and the second feeding pole 202 is weakened.

Further, even in the case of the angle difference Δwθ=−1(°) and the area ratio Sa/S=65%, the effect of suppressing the occurrence of the abnormal image was confirmed. However, in this condition, the magnetic field between the receiving pole 201D and the second feeding pole 202 is changed in a weakening direction due to some change in magnetic pole position by the influence of assembling tolerances of the first magnet 36 and the second magnet 37, and a variation in magnetization, so that an effect of weakening the magnetic field between the first feeding pole 105 and the second feeding pole 202 becomes low in some cases. For this reason, Δwθ≥0 may preferably be satisfied, and in this case, Sa/S≥65% may only be required to be satisfied. However, it is more preferable that the angle difference Δwθ≥0 and the area ratio Sa/S≥70% are satisfied.

As described above, according to this embodiment, occurrence of an image defect can be suppressed. That is, in the developing device 1Y of this embodiment, the developer fed from the first feeding pole 105 to the delivering pole 106 on the first sleeve 33 and is delivered to the second sleeve 34 on the basis of the magnetic field between the delivering pole 106 and the receiving pole 201D, and then is conveyed on the second sleeve 34 from the receiving pole 201D to the second feeding pole 202. In such a constitution, the developer is moved by the magnetic force along the magnetic field between the first feeding pole 105 and the second feeding pole 202 in some cases. On the other hand, in this embodiment, the magnetic flux density of the receiving pole 201D satisfies the angle difference Δwθ≥0 and the area ratio Sa/S≥65%, preferably the area ratio Sa/S≥70% as described above, so that the magnetic field between the second feeding pole 202 and the receiving pole 201D weakens the magnetic field between the first feeding pole 105 and the second feeding pole 202, and therefore movement of the developer between the first feeding pole 105 and the second feeding pole 202 can be suppressed. For this reason, the occurrence of the above-described stripe-shaped fog image can be suppressed.

Fifth Embodiment

A fifth embodiment will be described using FIG. 19. This embodiment is different from the first embodiment in constitution of a receiving pole 201E of a second magnet 37 of a first developing roller 30. Other constitutions and actions are similar to those in the first embodiment, and therefore, as regards similar constitutions, description and illustration are omitted or briefly made by adding the same reference numerals or symbols, and in the following, a difference from the first embodiment will be principally described.

Figure 19:
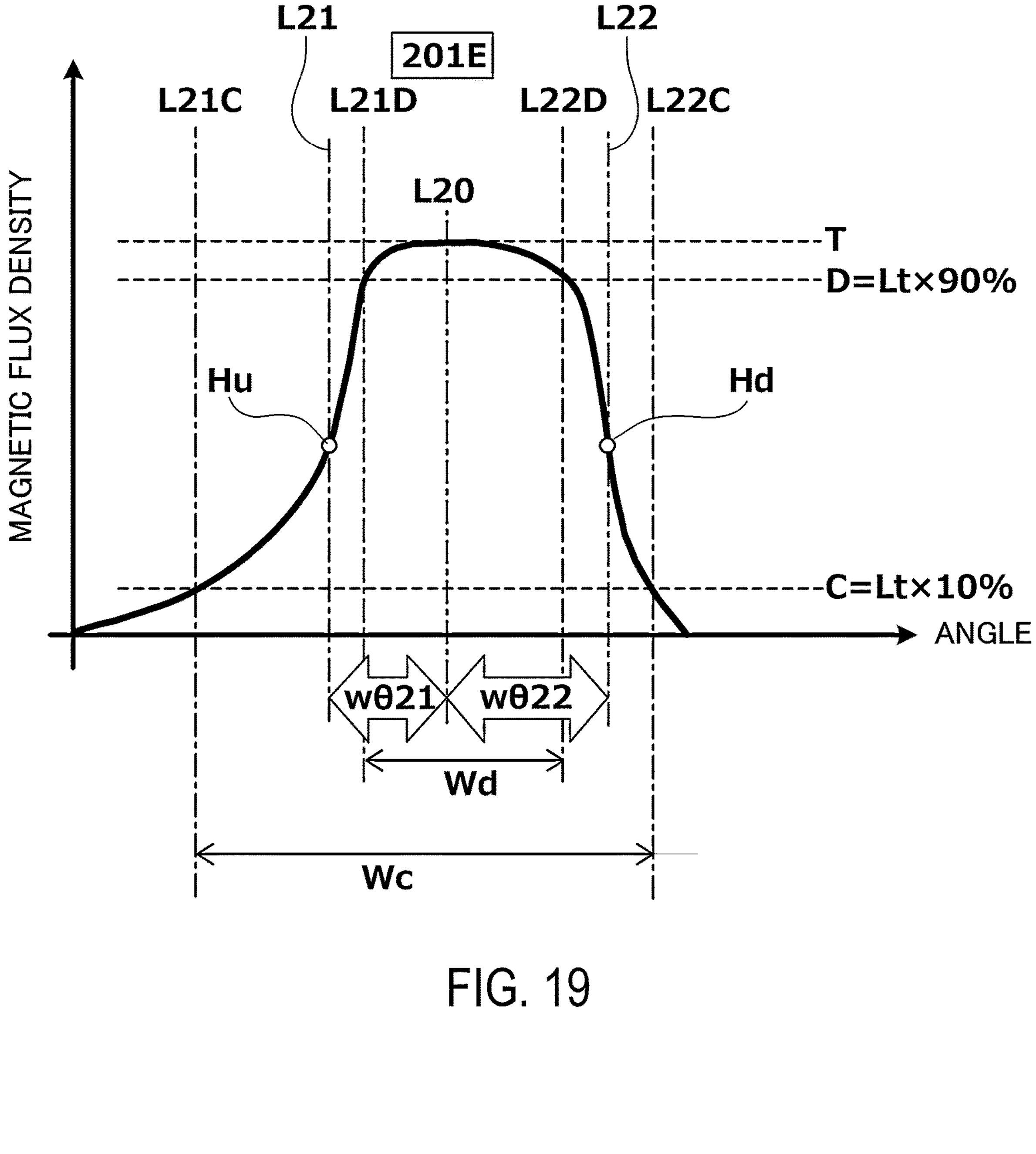
FIG. 19 is a graph showing a magnetic characteristic at a periphery of a receiving pole of a second developing roller in a fifth embodiment in an enlarged manner.

In this embodiment, as shown in FIG. 19, in the position of the receiving pole 201 of the second magnet 37 employed in the first embodiment, the receiving pole 201E is provided. A magnetic flux density peak value of this receiving pole 201E is the same as the magnetic flux density peak value of the receiving pole 201. On the other hand, this embodiment is characterized that a shape of the magnetic flux density peak value of the receiving pole 201E is a shape close to a flat shape, and that of half values, a downstream-side width is wider than an upstream-side width. Specifically, a constitution satisfying the angle difference Δwθ≥0 described in the first embodiment and the angle ratio W/Wc≥35% described in the third embodiment. Incidentally, in the case of this embodiment, different from the third embodiment, Δwθ≥0 is satisfied, and therefore, as regards the angle ratio Wd/Wc, Wd/Wc≥30% may only be required to be satisfied. However, it is preferable that Wd/Wc≥35% is satisfied.

In such a case of this embodiment, the magnetic flux density of the receiving pole 201E on a side downstream of the magnetic flux density peak value of the receiving pole 201E in a range close to the second feeding pole 202 is larger than the magnet flux densities of the delivering poles in the same range in the first embodiment and the third embodiment. For that reason, compared with the first and third embodiments, the magnetic field between the second feeding pole 202 and the receiving pole 201E is stronger and an effect of weakening the magnetic field between the first feeding pole 105 and the second feeding pole 202 is higher. For this reason, an effect of suppressing the movement of the developer between the first feeding pole 105 and the second feeding pole 202 becomes high.

[Experiment]

Next, an experiment in which an occurrence status of a stripe-shaped fog image (abnormal image) in the above-described constitution was checked will be described. In the example, the angle difference Δwθ and the angle ratio Wd/Wc were changed by adjusting the magnetic flux density of the receiving pole 201E, and images were outputted by image forming apparatuses in which delivering poles in various conditions are incorporated. Then, the occurrence status of the stripe-shaped fog image on the output image was checked.

Other conditions and evaluation of the experiment are the same as those of the experiment described in the first embodiment. A result of this experiment is shown in a table 6.

TABLE 6

| Δwθ[°] | −3 | −1 | 0 | 2 | 3 |
|---|---|---|---|---|---|
| Sa/S | 25% | 30% | 35% | 41% | 46% |
| AI*1 | X | Δ | ○ | ○ | ○ |

*1"AI" is the abnormal image.

Constitutions of the first developing roller 30 and the second developing roller 31 in the experiment are as shown in FIG. 6. A magnetic characteristic is such that a magnetic flux density peak value of the receiving pole 201E was fixed to 562 gauss and that the angle difference Δwθ was changed from −3(°) to 3(°), and at the same time, a shape of the magnetic flux density of the receiving pole 201E was changed stepwise from 25% to 46% in terms of the angle ratio Wd/Wc. The magnetic poles other than the receiving pole 201E are as shown in FIG. 7.

As is apparent from the table 6, when the angle difference Δwθ is 0(°) or more, and the angle ratio Wd/Wc is 35% or more, occurrence of the abnormal image was able to be suppressed. This is an effect such that the neighborhood of the magnetic flux density peak value of the receiving pole 201E approaches the second feeding pole 202, and thus the magnetic field between the second feeding pole 202 and the receiving pole 201E is strengthened and the magnetic field between the first feeding pole 105 and the second feeding pole 202 is weakened.

Further, even in the case of the angle difference Δwθ=−1(°) and the angle ratio Wd/Wc=30%, the effect of suppressing the occurrence of the abnormal image was confirmed. However, in this condition, the magnetic field between the receiving pole 201E and the second feeding pole 202 is changed in a weakening direction due to some change in magnetic pole position by the influence of assembling tolerances of the first magnet 36 and the second magnet 37, and a variation in magnetization, so that an effect of weakening the magnetic field between the first feeding pole 105 and the second feeding pole 202 becomes low in some cases. For this reason, Δwθ≥0 may preferably be satisfied, and in this case, Wd/Wc≥30% may only be required to be satisfied. However, it is more preferable that the angle difference Δwθ≥0 and the angle ratio Wd/Wc≥35% are satisfied.

As described above, according to this embodiment, occurrence of an image defect can be suppressed. That is, in the developing device 1Y of this embodiment, the developer fed from the first feeding pole 105 to the delivering pole 106 on the first sleeve 33 and is delivered to the second sleeve 34 on the basis of the magnetic field between the delivering pole 106 and the receiving pole 201E, and then is conveyed on the second sleeve 34 from the receiving pole 201E to the second feeding pole 202. In such a constitution, the developer is moved by the magnetic force along the magnetic field between the first feeding pole 105 and the second feeding pole 202 in some cases. On the other hand, in this embodiment, the magnetic flux density of the receiving pole 201E satisfies the angle difference Δw≥0 and the area ratio Wd/Wc≥30%, preferably the angle ratio Sa/S≥35% as described above, so that the magnetic field between the first feeding pole 105 and the receiving pole 201E weakens the magnetic field between the first feeding pole 105 and the second feeding pole 202, and therefore movement of the developer between the first feeding pole 105 and the second feeding pole 202 can be suppressed. For this reason, the occurrence of the above-described stripe-shaped fog image can be suppressed.

Sixth Embodiment

A sixth embodiment will be described using FIG. 20. This embodiment is different from the first embodiment in constitution of a first magnetic pole 106A of a first magnet 36 of a first developing roller 30. Other constitutions and actions are similar to those in the first embodiment, and therefore, as regards similar constitutions, description and illustration are omitted or briefly made by adding the same reference numerals or symbols, and in the following, a difference from the first embodiment will be principally described.

Here, a position (peak position) of a maximum (value) (peak value) of a normal component of a magnetic flux density of the delivering pole 106A on the surface of the first sleeve 33 is taken as a point T. Further, of half-value positions of the maximum value) of the normal component of the magnetic flux density of the delivering pole 106A, a downstream-side position with respect to the rotational direction of the first sleeve 33 is taken as Hd', and an upstream-side position with respect to the rotational direction of the first sleeve 33 is taken as Hu'. Further, rectilinear lines L1, L3, L4, L10, L11, and L12 which are indicated by chain lines in FIG. 20 are defined as follows:

L1: horizontal line passing through rotation center R1 of first sleeve 33, L3: vertical line passing through rotation center R1 of first sleeve 33, L4: rectilinear line passing through rotation center R1 and rotation center R2, L10: rectilinear line connecting portion R1 and point T' (magnetic flux density peak position of delivering pole 106A), L11: rectilinear line connecting rotation center R1 and point Hd' (downstream-side position of half value of magnetic flux density peak value of delivering pole 106A with respect to rotational direction 81 of first sleeve 33), and L12: rectilinear line connecting rotation center R1 and point Hu' (upstream-side position of half value of magnetic flux density peak value of delivering pole 106A with respect to rotational direction 81 of first sleeve 33).

Figure 20:
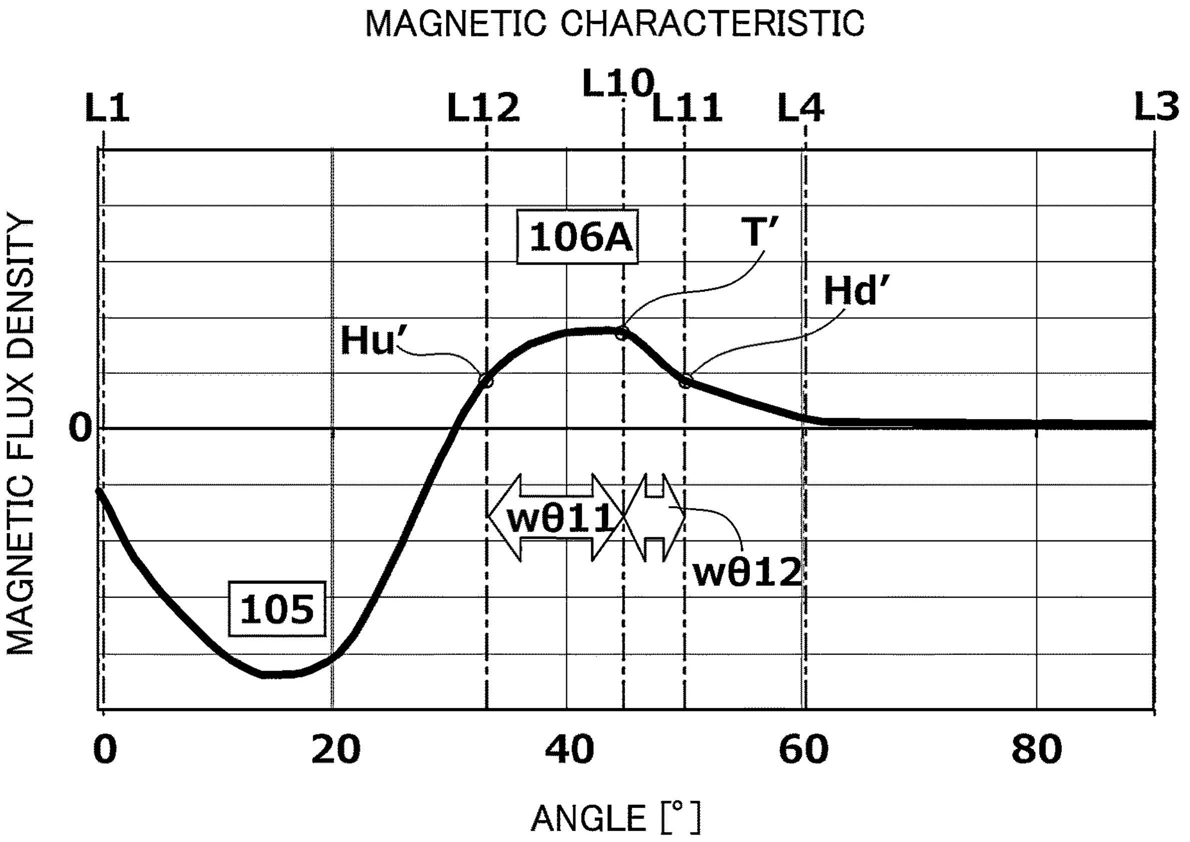
FIG. 20 is a graph showing a magnetic characteristic at a periphery of a delivering pole of a first developing roller in a sixth embodiment.
Figure 21:
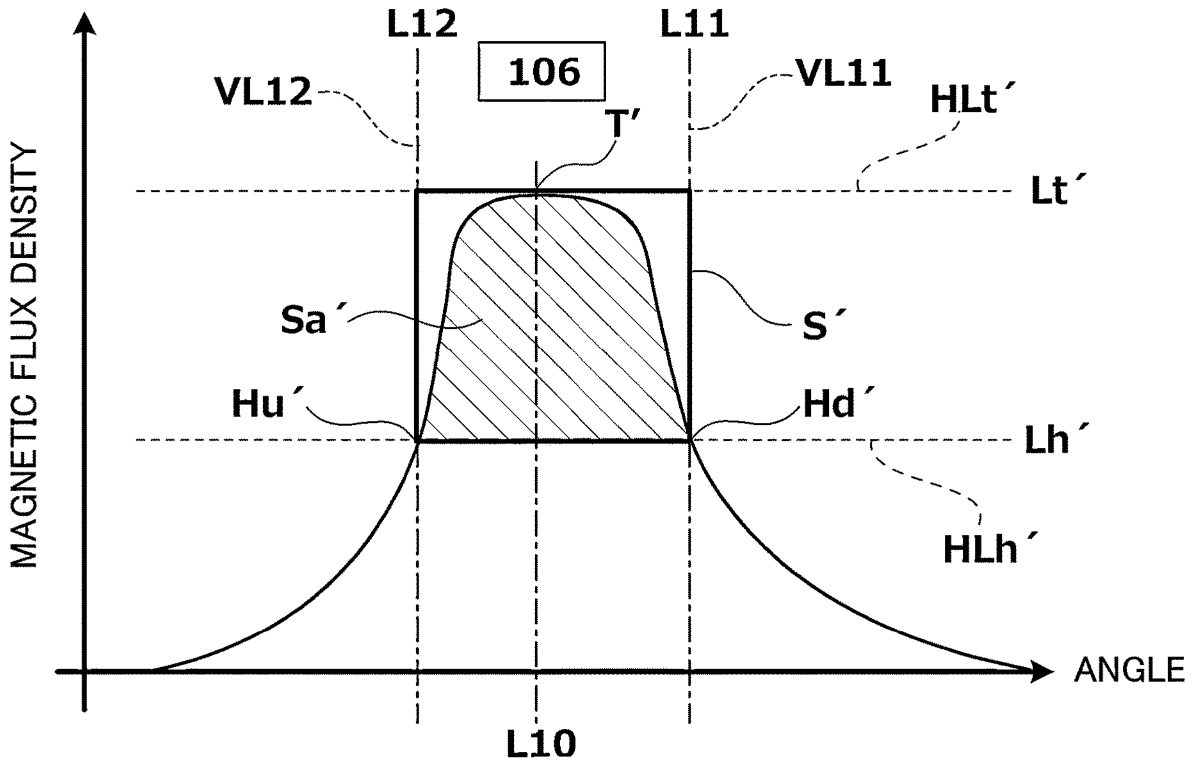
FIG. 21 is a graph showing a magnetic characteristic of a delivering pole in a first condition in another embodiment in an enlarged manner.

In this embodiment, as shown in FIG. 20, in a position of the delivering pole 106 of the first magnet 36 employed in the embodiment 1, the delivering pole 106A is disposed. A magnetic flux density peak value of this delivering pole 106A is the same as the magnetic flux density peak value of the delivering pole 106. On the other hand, of half-value widths of the magnetic flux density peak value of the delivering pole 106A, an angle, formed by the rectilinear lines L10 and L12, which is the half-value width one side upstream of the magnetic flux density peak position of the delivering pole 106A, is taken as an angle wθ11, and an angle, formed by the rectilinear lines 10 and 11, which is the half-value width on a side downstream of the magnetic flux density peak position of the delivering pole 106A, is taken as wθ12. Further, an angle difference (wθ11-*w*θ12) of the angle wθ12 relative to the angle wθ11 is taken as an angle difference Δwθ1', i.e., Δwθ'=wθ11-*w*θ12. In this case, the delivering pole 106A is set to satisfy: Δwθ'>0. That is, in this embodiment, the angle difference Δwθ>0 described in the embodiment 1 and Δwθ'≥0 are satisfied.

In such a case of this embodiment, compared with the first embodiment, the upstream-side magnetic flux value is larger than the magnetic flux density peak value of the delivering pole 106 close to the first feeding pole 105. For that reason, the magnetic field acting between the delivering pole 106A and the first feeding pole 105 is stronger than that in the first embodiment, so that an effect of weakening the magnetic field between the first feeding pole 105 and the second feeding pole 202 is large. For this reason, an effect of preventing the movement of the developer between the first feeding pole 105 and the second feeding pole 202 becomes large.

[Experiment]

Next, an experiment in which an occurrence status of a stripe-shaped fog image (abnormal image) in the above-described constitution was checked will be described. In the example, the angle difference Δwθ and the angle difference Δwθ' were changed by adjusting the magnetic flux density of the delivering pole 106A and the receiving pole 201, and images were outputted by image forming apparatuses in which delivering poles in various conditions are incorporated. Then, the occurrence status of the stripe-shaped fog image on the output image was checked.

Other conditions and evaluation of the experiment are the same as those of the experiment described in the first embodiment, but in this experiment, the following evaluation standard is added.

⊚: On 10000 A3-sized sheets, about one vertical stripe was recognized.

A result of this experiment is shown in a table 4.

TABLE 7

| | Δwθ[°] | | | | |
|---|---|---|---|---|---|
| | −3 | −1 | 0 | 2 | 3 |
| | Δwθ[°] | | | | |
| | −3 | 0 | 0 | 2 | 3 |
| AI*[1] | X | ○ | ○ | ◎ | ◎ |

*[1]"AI" is the abnormal image.

Constitutions of the first developing roller 30 and the second developing roller 31 in the experiment are as shown in FIG. 6. The magnetic flux density peak value of the delivering pole 106A was fixed to 360 gauss, and the magnetic flux density peak value of the receiving pole 201 was fixed to 562 GA. A shape of each of the magnetic flux density of the delivering pole 106A and the receiving pole 201 was changed stepwise from −3[°] to +3[°] in terms of the angle ratio difference 420 or Δwe'. Other magnetic poles are as shown in FIG. 7.

As is apparent from the table 7, when the angle difference Δwθ'=0° holds even at the angle difference Δwθ=−1°, occurrence of the abnormal image was able to be suppressed. Further, when the angle differences Δwθ≥0 and Δwθ'≥0, preferably the angle differences Δwθ>0 and Δwθ'>0 hold, an effect of suppressing the occurrence of the abnormal image became large. This is an effect such that the neighborhood of the magnetic flux density peak value of the delivering pole 106A approaches the first feeding pole 105, and not only the magnetic field acting between the receiving pole 201 and the second feeding pole 202 is strengthened but also the magnetic field acting between the delivering pole 106A and the first feeding pole 105 is strengthened, and thus the magnetic field acting between the first feeding pole 105 and the second feeding pole 202 is weakened.

As described above, according to this embodiment, occurrence of an image defect can be suppressed. That is, in the developing device 1Y of this embodiment, the developer fed from the first feeding pole 105 to the delivering pole 106A on the first sleeve 33 and is delivered to the second sleeve 34 on the basis of the magnetic field between the delivering pole 106A and the receiving pole 201, and then is conveyed on the second sleeve 34 from the receiving pole 201 to the second feeding pole 202. In this embodiment, by constituting the magnetic flux density of the delivering pole 106A so as to satisfy the angle difference Δwθ'≥0 as described above, compared with the first embodiment, the magnetic field acting between the delivering pole 106A and the first feeding pole 105 is strengthened, so that the effect of weakening the magnetic field acting between the first feeding pole 105 and the second feeding pole 202 becomes large. For this reason, movement of the developer between the first feeding pole 105 and the second feeding pole 202 can be suppressed, so that the occurrence of the above-described stripe-shaped fog image can be suppressed.

Other Embodiments

Also, the first magnet 36 in the above-described second to fifth embodiment may also satisfy the angle difference Δwθ≥0 in the sixth embodiment. Further, in the first to sixth embodiments, the first magnet 36 including the delivering pole 106 satisfying the following first condition or second condition may be used.

[First Condition]

First, in a graph in which a normal component of the magnetic flux density of the delivering pole 106A on the surface of the first sleeve 33 is expressed in terms of the magnetic flux density in the abscissa and an angle thereof with respect to the rotational direction of the first sleeve 33, as in the following, values Lt' and Lh' and rectilinear lines 10, 11, 12, HLt', HLh', VL11, and VL12 are defined:

Lt': peak value (maximum value of normal component of magnetic flux density of delivering pole 106 on surface of the first sleeve 33, Lh': half value of peak value Lt of magnetic flux density of delivering pole 106, L10: rectilinear line connecting rotation center R1 and point T' (magnetic flux density peak position of delivering pole 106), L11: rectilinear line connecting rotation center R1 and point Hd' (downstream-side position of half value of magnetic flux density peak value of delivering pole 106 with respect to rotational direction 81 of first sleeve 33), L12: rectilinear line connecting rotation center R1 and point Hu' (upstream-side position of half value of magnetic flux density peak value of delivering pole 106 with respect to rotational direction 81 of first sleeve 33), HLt': rectilinear line parallel to abscissa passing through position of value Lt', HLh': rectilinear line parallel to abscissa passing through position of value Lh', VL11: rectilinear line parallel to ordinate passing through point Hu', and VL12: rectilinear line parallel to ordinate passing through point Hd'.

Incidentally, Hd' is similarly as the sixth embodiment, of half-value positions of the maximum value of the normal component of the magnetic flux density of the delivering pole 106, a downstream-side position with respect to the rotational direction of the first sleeve 33. Further, Hu' is, similarly as the sixth embodiment, of the half-value positions of the normal component of the magnetic flux density of the delivering pole 106, an upstream-side position with respect to the rotational direction of the first sleeve 33.

Further, a rectangular area enclosed by the rectilinear lines VL11, VL12, HLt', and HLh' is an area S', and in the graph, an area (hatched portion) obtained by integrating the normal component of the magnetic flux density of the delivering pole 106 from the rectilinear line VL11 to the rectilinear line VL12 in terms of an angle with respect to the rotational direction of the first sleeve 33 is an area Sa'. In this case, an angle ratio Sa'/S'≥75% is satisfied.

[Second Condition]

Figure 22:
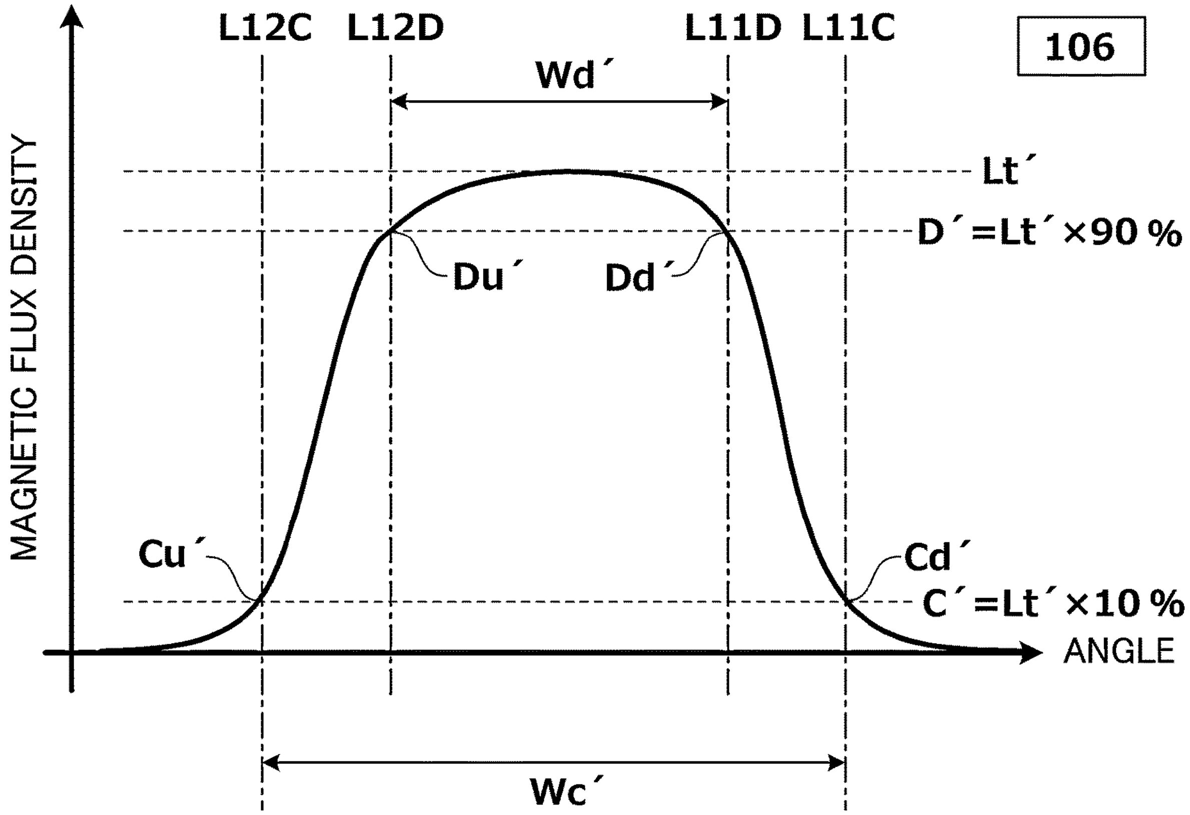
FIG. 22 is a graph showing a magnetic characteristic of a delivering pole in a first condition in another embodiment in an enlarged manner.

As shown in FIG. 22, as described in the following, values C' and D', points Cd', Cu', Dd', and Du', rectilinear lines L11C, L12C, L11D, and L12D, and angles Wc' and Wd' are defined. Incidentally, a value Lt is a magnetic flux density peak value of the delivering pole 106 similarly as in the first condition.

C': value of 10% of value Lt',

D': value of 90% of value Lt',

Cd': downstream-side position, with respect to rotational direction of first sleeve 33, of positions where normal component of magnetic flux density of delivering pole 106 becomes value C', Cu': downstream-side position, with respect to rotational direction of first sleeve 33, of positions where normal component of magnetic flux density of delivering pole 106 becomes value C', Dd': downstream-side position, with respect to rotational direction of first sleeve 33, of positions where normal component of magnetic flux density of delivering pole 106 becomes value D', Du': upstream-side position, with respect to rotational direction of first sleeve 33, of positions where normal component of magnetic flux density of delivering pole 106 becomes value D', L11C: rectilinear line connecting rotation center R1 of first sleeve 33 and point Cd', L12C: rectilinear line connecting rotation center R1 and point Cu', L11D: rectilinear line connecting rotation center R1 and point Dd', L12D: rectilinear line connecting rotation center R1 and point Du', Wc': angle formed by rectilinear line L11C and rectilinear line L12C, and Wd': angle formed by rectilinear line L11D and rectilinear line L12D.

In this case, an angle ratio Wd'/Wc'≥45% is satisfied.

In the developing device 1Y of the first to sixth embodiments, the developer fed from the first feeding pole 105 to the delivering pole 106A on the first sleeve 33 and is delivered to the second sleeve 34 on the basis of the magnetic field between the delivering pole 10A6 and the receiving pole 201, and then is conveyed on the second sleeve 34 from the receiving pole 201 to the second feeding pole 202. Further, in the first to sixth embodiments, in the developing device 1Y of other embodiments in which the first magnet 36 including the delivering pole 106 satisfying the above-described first condition or second condition, compared with the developing device 1Y of the first to sixth embodiments, the magnetic field acting between the delivering pole 106A and the first feeding pole 105 becomes strong, so that the effect of weakening the magnetic field acting between the first feeding pole 105 and the second feeding pole 202 becomes large. As a result, the movement of the developer between the first feeding pole 105 and the second feeding pole 202 can be suppressed, so that the effect of suppressing the occurrence of the above-described stripe-shaped fog image.

The present invention is not limited to the constitution of the above-described embodiments. For example, the image forming apparatus 100 is not limited to the MFP, but may also be a copying machine, a printer, or a facsimile machine. Further, the constitutions of the developer supplying screw 42, the developer stirring screw 43, and the developer collecting screw 44 are not particularly limited when the constitutions can convey the developer, and for example, it is possible to apply a helical blade, a paddle-like blade.

Further, in the above-described embodiments, a constitution in which the first sleeve 33 and the photosensitive drum 28Y are rotated in the same direction in mutually opposing positions and in which the second sleeve 34 and the photosensitive drum 28Y are rotated in the same direction in mutually opposing positions was described but the present invention is not limited thereto.

A constitution in which the rotation center R2 of the second developing roller 31 is disposed above the rotation center R1 of the first developing roller 30, in which the first sleeve 33 and the photosensitive drum 28Y are rotated in opposite directions in the mutually opposing positions, and in which the second sleeve 34 and the photosensitive drum 28Y are rotated in opposite directions in the mutually opposing positions may be employed. That is, in this constitution, counter development such that the photosensitive drum 28 is rotated from above to below in the vertical direction in a position where the photosensitive drum 28 opposes the first developing roller 30 is made, and counter development such that the photosensitive drum 28 is rotated from above to below in the vertical direction in a position where the photosensitive drum 28 opposes the second developing roller 31 is made. The present invention is also applicable to such a constitution. Further, in the case where three or more developing rollers are provided, the present invention is also applicable to arbitrary two developing rollers.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-185955 filed on Oct. 30, 2023, which is hereby incorporated by reference herein in its entirety.

What is claimed is:

1. A developing device comprising:

a developing container configured to accommodate a developer including toner and a carrier;

a first rotatable member to which the developer accommodated in the developing container is supplied and which carries and feeds the developer to a first developing position where an electrostatic latent image formed on an image bearing member is developed;

a first magnet provided non-rotatably and stationarily inside the first rotatable member, wherein the first magnet includes a first developing pole provided opposed to the image bearing member in the first developing position, a delivering pole provided downstream of the first developing pole with respect to a rotational direction of the first rotatable member, and a first feeding pole provided upstream of the delivering pole and adjacent to the delivering pole, with respect to the rotational direction of the first rotatable member, and having a magnetic polarity different from the delivering pole;

a second rotatable member provided opposed to the first rotatable member and to which the developer is delivered from the first rotatable member by a magnetic field generated by the first magnet, wherein the second rotatable member carries and feeds the developer to a second developing position where the electrostatic latent image is developed, and wherein a rotational direction of the second rotatable member in a position where, on an outer peripheral surface of the second rotatable member, the second rotatable member is closest to the first rotatable member, is opposite to the rotational direction of the first rotatable member in a position where, on an outer peripheral surface of the first rotatable member, the first rotatable member is closest to the second rotatable member; and a second magnet provided non-rotatably and stationarily inside the second rotatable member, wherein the second magnet includes a plurality of magnetic poles including a second developing pole provided opposed to the image bearing member in the second developing position, a receiving pole provided upstream of the second developing pole with respect to the rotational direction of the second rotatable member and having a magnetic polarity different from that of the delivering pole, and a second feeding pole provided downstream of the receiving pole and adjacent to the receiving pole, with respect to the rotational direction of the second rotatable member, and having a magnetic polarity different from that of the receiving pole, the receiving pole being a magnetic pole, of the plurality of magnetic poles, provided closest to the delivering pole, wherein in a case in which:

a position where, on the outer peripheral surface of the second rotatable member, a magnetic flux density of the receiving pole in a normal direction relative to the outer peripheral surface of the second rotatable member is maximum, is a point (T), a position where, on the outer peripheral surface of the second rotatable member, the magnetic flux density of the receiving pole in the normal direction relative to the outer peripheral surface of the second rotatable member is a half value of the maximum, is a point (Hu), the point (Hu) being positioned upstream of the point (T) with respect to the rotational direction of the second rotatable member, a position where, on the outer peripheral surface of the second rotatable member, the magnetic flux density of the receiving pole in the normal direction relative to the outer peripheral surface of the second rotatable member is the half value of the maximum, is a point (Hd), the point (Hd) being positioned, downstream of the point (T) with respect to the rotational direction of the second rotatable member, an angle formed by a rectilinear line (L20) connecting a rotation center (R2) of the second rotatable member and the point (T) and by a rectilinear line (L21) connecting the rotation center (R2) and the point (Hu) is an angle wθ21, and an angle formed by the rectilinear line (L20) and a rectilinear line (L22) connecting the rotation center (R2) and the point (Hd) is an angle wθ22, the following relationship is satisfied:

$$w\theta 22 - w\theta 21 \geq 0.$$

2. A developing device according to claim 1, wherein the following relationship is further satisfied:

$$w\theta 22 - w\theta 21 > 0.$$

3. A developing device according to claim 1, wherein in a case in which, in a graph in which an ordinate represents the magnetic flux density of the receiving pole in the normal direction relative to the outer peripheral surface of the second rotatable member and an abscissa represents an angle of the second rotatable member with respect to the rotational direction of the second rotatable member;

a rectilinear line passing through the point (T) and parallel to the abscissa is a rectilinear line (HLt), a rectilinear line passing through the points (Hu) and (Hd) and parallel to the abscissa is a rectilinear line (HLh), a rectilinear line passing through the point (Hu) and parallel to the ordinate is a rectilinear line (VL21), a rectilinear line passing through the point (Hd) and parallel to the ordinate is a rectilinear line (VL22), an area of a rectangle enclosed by the rectilinear lines (VL21), (VL22), (HLt), and (HLh) is an area S, and in a region of the rectangle, an area obtained by integrating the magnetic flux density of the receiving pole, in the normal direction relative to the outer peripheral surface of the second rotatable member, from the rectilinear line (VL21) to the rectilinear line (VL22) in terms of the angle of the second rotatable member with respect to the rotational direction of the second rotatable member is an area Sa, the following relationship is satisfied:

$$Sa/S \geq 65\%.$$

4. A developing device according to claim 3, wherein the following relationship is further satisfied:

$$Sa/S \geq 70\%.$$

5. A developing device according to claim 1, wherein in a case in which, in a graph in which an ordinate represents the magnetic flux density of the receiving pole in the normal direction relative to the outer peripheral surface of the second rotatable member and an abscissa represents an angle of the second rotatable member with respect to the rotational direction of the second rotatable member:

a position where, on the outer peripheral surface of the second rotatable member, the magnetic flux density of the receiving pole in the normal direction relative to the outer peripheral surface of the second rotatable member is a value which is 10% of the maximum, is a point (Cu), the point (Cu) being positioned upstream of the point (T) with respect to the rotational direction of the second rotatable member, a position where, on the outer peripheral surface of the second rotatable member, the magnetic flux density of the receiving pole in the normal direction relative to the outer peripheral surface of the second rotatable member is a value which is 10% of the maximum, is a point (Cd), the point (Cd) being positioned downstream of the point (T) with respect to the rotational direction of the second rotatable member, a position where, on the outer peripheral surface of the second rotatable member, the magnetic flux density of the receiving pole in the normal direction relative to the outer peripheral surface of the second rotatable member is a value which is 90% of the maximum, is a point (Du), the point (Du) being positioned upstream of the point (T) with respect to the rotational direction of the second rotatable member, and a position where, on the outer peripheral surface of the second rotatable member, the magnetic flux density of the receiving pole in the normal direction relative to the outer peripheral surface of the second rotatable member is a value which is 90% of the maximum, is a point (Dd), the point (Dd) being positioned downstream of the point (T) with respect to the rotational direction of the second rotatable member, an angle formed by a rectilinear line (L21C) connecting the rotation center (R2) and the point (Cu) and a rectilinear line (L22C) connecting the rotation center (R2) and the point (Cd) is an angle Wc, and an angle formed by a rectilinear line (L21D) connecting the rotation center (R2) and the point (Du) and a rectilinear line (L22D) connecting the rotation center (R2) and the point (Dd) is an angle Wd, the following relationship is satisfied:

$$Wd/Wc \geq 30\%.$$

6. A developing device according to claim 5, wherein the following relationship is further satisfied:

$$Wd/Wc \geq 35\%.$$

7. A developing device according to claim 1, wherein in a case in which:

a position where, on the outer peripheral surface of the first rotatable member, a magnetic flux density of the delivering pole in a normal direction relative to the outer peripheral surface of the first rotatable member is maximum, is a point (T'), a position where, on the outer peripheral surface of the first rotatable member, the magnetic flux density of the delivering pole in the normal direction relative to the outer peripheral surface of the first rotatable member is a half value of the maximum, is a point (Hd'), the point (Hd') being positioned, downstream of the point (T') with respect to the rotational direction of the first rotatable member, a position where, on the outer peripheral surface of the first rotatable member, the magnetic flux density of the delivering pole in the normal direction relative to the outer peripheral surface of the first rotatable member is the half value of the maximum, is a point (Hu'), the point (Hu') being positioned, upstream of the point (T') with respect to the rotational direction of the first rotatable member, an angle formed by a rectilinear line (L10) connecting a rotation center (R1) of the first rotatable member and the point (T') and by a rectilinear line (L12) connecting the rotation center (R1) and the point (Hu') is an angle wθ11, and an angle formed by the rectilinear line (L10) and a rectilinear line (L11) connecting the rotation center (R1) and the point (Hd') is an angle wθ12, the following relationship is satisfied:

$$w\theta 11 - w\theta 12 \geq 0.$$

8. A developing device according to claim 7, wherein the following relationship is further satisfied:

$$w\theta 11 - w\theta 12 > 0.$$

9. A developing device comprising:

a developing container configured to accommodate a developer including toner and a carrier;

a first rotatable member to which the developer accommodated in the developing container is supplied and which carries and feeds the developer to a first developing position where an electrostatic latent image formed on an image bearing member is developed;

a first magnet provided non-rotatably and stationarily inside the first rotatable member, wherein the first magnet includes a first developing pole provided opposed to the image bearing member in the first developing position, a delivering pole provided downstream of the first developing pole with respect to a rotational direction of the first rotatable member, and a first feeding pole provided upstream of the delivering pole and adjacent to the delivering pole, with respect to the rotational direction of the first rotatable member, and having a magnetic polarity different from the delivering pole;

a second rotatable member provided opposed to the first rotatable member and to which the developer is delivered from the first rotatable member by a magnetic field generated by the first magnet, wherein the second rotatable member carries and feeds the developer to a second developing position where the electrostatic latent image is developed, and wherein a rotational direction of the second rotatable member in a position where, on an outer peripheral surface of the second rotatable member, the second rotatable member is closest to the first rotatable member is opposite to the rotational direction of the first rotatable member in a position where, on an outer peripheral surface of the first rotatable member, the first rotatable member is closest to the second rotatable member; and a second magnet provided non-rotatably and stationarily inside the second rotatable member, wherein the second magnet includes a plurality of magnetic poles including a second developing pole provided opposed to the image bearing member in the second developing position, a receiving pole provided upstream of the second developing pole with respect to the rotational direction of the second rotatable member and having a magnetic polarity different from that of the delivering pole, and a second feeding pole provided downstream of the receiving pole and adjacent to the receiving pole, with respect to the rotational direction of the second rotatable member, and having a magnetic polarity different from that of the receiving pole, the receiving pole being a magnetic pole, of the plurality of magnetic poles, provided closest to the delivering pole, wherein in a case in which:

a position where, on the outer peripheral surface of the second rotatable member, a magnetic flux density of the receiving pole in a normal direction relative to the outer peripheral surface of the second rotatable member is maximum, is a point (T), a position where, on the outer peripheral surface of the second rotatable member, the magnetic flux density of the receiving pole in the normal direction relative to the outer peripheral surface of the second rotatable member is a half value of the maximum, is a point (Hu), the point (Hu) being positioned upstream of the point (T) with respect to the rotational direction of the second rotatable member, and a position where, on the outer peripheral surface of the second rotatable member, the magnetic flux density of the receiving pole in the normal direction relative to the outer peripheral surface of the second rotatable member is the half value of the maximum, is a point (Hd), the point (Hd) being positioned downstream of the point (T) with respect to the rotational direction of the second rotatable member, and in a case in which in a graph in which an ordinate represents the magnetic flux density of the receiving pole in the normal direction relative to the outer peripheral surface of the second rotatable member and an abscissa represents an angle of the second rotatable member with respect to the rotational direction of the first rotatable member:

a rectilinear line passing through the point T and parallel to the abscissa is a rectilinear line (HLt), a rectilinear line passing through the points (Hu) and (Hd) and parallel to the abscissa is a rectilinear line (HLh), a rectilinear line passing through the point (Hu) and parallel to the ordinate is a rectilinear line (VL21), a rectilinear line passing through the point (Hd) and parallel to the ordinate is a rectilinear line (VL22), an area of a rectangle enclosed by the rectilinear lines (VL21), (VL22), (HLt), and (HLh) is an area S, and in a region of the rectangle, an area obtained by integrating the magnetic flux density of the receiving pole, in the normal direction relative to the outer peripheral surface of the second rotatable member, from the rectilinear line (VL21) to the rectilinear line (VL22) in terms of the angle of the second rotatable member with respect to the rotational direction of the second rotatable member is an area Sa, the following relationship is satisfied:

$$Sa/S \geq 75\%.$$

10. A developing device comprising:

a developing container configured to accommodate a developer including toner and a carrier;

a first rotatable member to which the developer accommodated in the developing container is supplied and which carries and feeds the developer to a first developing position where an electrostatic latent image formed on an image bearing member is developed;

a first magnet provided non-rotatably and stationarily inside the first rotatable member, wherein the first magnet includes a first developing pole provided opposed to the image bearing member in the first developing position, a delivering pole provided downstream of the first developing pole with respect to a rotational direction of the first rotatable member, and a first feeding pole provided upstream of the delivering pole and adjacent to the delivering pole, with respect to the rotational direction of the first rotatable member, and having a magnetic polarity different from the delivering pole;

a second rotatable member provided opposed to the first rotatable member and to which the developer is delivered from the first rotatable member by a magnetic field generated by the first magnet, wherein the second rotatable member carries and feeds the developer to a second developing position where the electrostatic latent image is developed, and wherein a rotational direction of the second rotatable member in a position where, on an outer peripheral surface of the second rotatable member, the second rotatable member is closest to the first rotatable member, is opposite to the rotational direction of the first rotatable member in a position where, on an outer peripheral surface of the first rotatable member, the first rotatable member is closest to the second rotatable member; and a second magnet provided non-rotatably and stationarily inside the second rotatable member, wherein the second magnet includes a plurality of magnetic poles including a second developing pole provided opposed to the image bearing member in the second developing position, a receiving pole provided upstream of the second developing pole with respect to the rotational direction of the second rotatable member and having a magnetic polarity different from that of the delivering pole, and a second feeding pole provided downstream of the receiving pole and adjacent to the receiving pole, with respect to the rotational direction of the second rotatable member, and having a magnetic polarity different from that of the receiving pole, the receiving pole being a magnetic pole, of the plurality of magnetic poles, provided closest to the delivering pole, wherein in case in which:

a position where, on the outer peripheral surface of the second rotatable member, a magnetic flux density of the receiving pole in a normal direction relative to the outer peripheral surface of the second rotatable member is maximum, is a point (T), a position where, on the outer peripheral surface of the second rotatable member, the magnetic flux density of the receiving pole in the normal direction relative to the outer peripheral surface of the second rotatable member is a half value of the maximum, is a point (Hu), the point (Hu) being positioned upstream of the point (T) with respect to the rotational direction of the second rotatable member, and a position where, on the outer peripheral surface of the second rotatable member, the magnetic flux density of the receiving pole in the normal direction relative to the outer peripheral surface of the second rotatable member is the half value of the maximum, is a point (Hd), the point (Hd) being positioned downstream of the point (T) with respect to the rotational direction of the second rotatable member, and in case in which in a graph in which an ordinate represents the magnetic flux density of the receiving pole in the normal direction relative to the outer peripheral surface of the second rotatable member and an abscissa represents an angle of the second rotatable member with respect to the rotational direction of the second rotatable member:

a position where, on the outer peripheral surface of the second rotatable member, the magnetic flux density of the receiving pole in the normal direction relative to the outer peripheral surface of the second rotatable member is a value which is 10% of the maximum, is a point (Cu), the point (Cu) being positioned upstream of the point (T) with respect to the rotational direction of the second rotatable member, Cu, a position where, on the outer peripheral surface of the second rotatable member, the magnetic flux density of the receiving pole in the normal direction relative to the outer peripheral surface of the second rotatable member is a value which is 10% of the maximum, is a point (Cd), the point (Cd) being positioned downstream of the point (T) with respect to the rotational direction of the second rotatable member, a position where, on the outer peripheral surface of the second rotatable member, the magnetic flux density of the receiving pole in the normal direction relative to the outer peripheral surface of the second rotatable member is a value which is 90% of the maximum, is a point (Du), the point (Du) being positioned upstream side of the point (T) with respect to the rotational direction of the second rotatable member, a position where, on the outer peripheral surface of the second rotatable member, the magnetic flux density of the receiving pole in the normal direction relative to the outer peripheral surface of the second rotatable member is a value which is 90% of the maximum, is a point (Dd), the point (Dd) being positioned downstream of the point (T) with respect to the rotational direction of the second rotatable member, an angle formed by a rectilinear line (L21C) connecting the rotation center (R2) and the point (Cu) and a rectilinear line (L22C) connecting the rotation center (R2) and the point (Cd) is an angle Wc, and an angle formed by a rectilinear line (L21D) connecting the rotation center (R2) and the point (Du) and a rectilinear line (L22D) connecting the rotation center (R2) and the point (Dd) is an angle Wd, the following relationship is satisfied:

$$Wd/Wc \geq 40\%.$$

* * * * *